(12) United States Patent
Irie et al.

(10) Patent No.: US 9,906,732 B2
(45) Date of Patent: Feb. 27, 2018

(54) IMAGE PROCESSING DEVICE, IMAGE CAPTURE DEVICE, IMAGE PROCESSING METHOD, AND PROGRAM

(71) Applicant: FUJIFILM Corporation, Tokyo (JP)

(72) Inventors: Kosuke Irie, Saitama (JP); Masahiko Sugimoto, Saitama (JP); Yousuke Naruse, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 89 days.

(21) Appl. No.: 15/012,239

(22) Filed: Feb. 1, 2016

(65) Prior Publication Data

US 2016/0150161 A1  May 26, 2016

Related U.S. Application Data

(63) Continuation of application No. PCT/JP2014/066432, filed on Jun. 20, 2014.

(30) Foreign Application Priority Data

Aug. 2, 2013  (JP) ................................ 2013-161000

(51) Int. Cl.
*H04N 5/00* (2011.01)
*G06K 9/40* (2006.01)
(Continued)

(52) U.S. Cl.
CPC .............. *H04N 5/243* (2013.01); *G06T 5/003* (2013.01); *H04N 5/238* (2013.01);
(Continued)

(58) Field of Classification Search
CPC ........... G06T 5/003; G06T 5/006; G06T 5/20; G06T 5/50; G06T 7/20;
(Continued)

(56) References Cited

U.S. PATENT DOCUMENTS

| 2009/0010662 A1* | 1/2009 | Naoi .................. G03G 15/5004 399/44 |
| 2010/0328480 A1 | 12/2010 | Kikuchi |
| 2011/0135213 A1* | 6/2011 | Hatakeyama ........... G06T 5/003 382/254 |
| 2013/0050541 A1* | 2/2013 | Hatakeyama ...... H04N 5/23229 348/241 |

(Continued)

FOREIGN PATENT DOCUMENTS

| JP | 2010-141661 A | 6/2010 |
| JP | 2011-10214 A | 1/2011 |

OTHER PUBLICATIONS

English translation of International Search Report for PCT/JP2014/066432 dated Feb. 2, 2016.
(Continued)

*Primary Examiner* — Xi Wang
(74) *Attorney, Agent, or Firm* — Birch, Stewart, Kolasch & Birch, LLP

(57) ABSTRACT

A restoration filter based on a point spread function of an optical system is applied to source image data acquired through photographing using the optical system to acquire restored image data (S13: filter application step). Adjustment of an amplification factor of the difference between source image data and restored image data is performed, and recovered image data is acquired from the difference after adjustment and source image data (S15: gain adjustment step). In the filter application step, a common filter determined regardless of a value of a magnification of an optical zoom of the optical system is used as the restoration filter, and in the gain adjustment step, the amplification factor is determined based on the magnification of the optical zoom of the optical system.

20 Claims, 22 Drawing Sheets

(51) Int. Cl.
| | |
|---|---|
| H04N 5/243 | (2006.01) |
| G06T 5/00 | (2006.01) |
| H04N 5/232 | (2006.01) |
| H04N 5/238 | (2006.01) |
| H04N 9/04 | (2006.01) |

(52) U.S. Cl.
CPC ..... H04N 5/23238 (2013.01); H04N 5/23296 (2013.01); H04N 9/045 (2013.01); *G06T 2207/20192* (2013.01)

(58) Field of Classification Search
CPC ........... G06T 2207/20024; G06T 2207/20201; H04N 5/225; H04N 5/23229
USPC ................................. 348/147, 607; 382/254
See application file for complete search history.

(56) References Cited

U.S. PATENT DOCUMENTS

| | | | | |
|---|---|---|---|---|
| 2015/0195447 A1* | 7/2015 | Endo | ...................... | H04N 5/217 348/349 |
| 2015/0208051 A1* | 7/2015 | Sugimoto | .............. | H04N 9/646 348/223.1 |

OTHER PUBLICATIONS

International Search Report for PCT/JP2014/066432 dated Sep. 9, 2014.

Written Opinion of the International Searching Authority for PCT/JP2014/066432 dated Sep. 9, 2014.

\* cited by examiner

IMAGE PROCESSING DEVICE, IMAGE
CAPTURE DEVICE, IMAGE PROCESSING
METHOD, AND PROGRAM

CROSS-REFERENCE TO RELATED
APPLICATIONS

This application is a Continuation of PCT International Application No. PCT/JP2014/066432 filed on Jun. 20, 2014, which claims priority under 35 U.S.C § 119(a) to Patent Application No. 2013-161000 filed in Japan on Aug. 2, 2013, all of which are hereby expressly incorporated by reference into the present application.

BACKGROUND OF THE INVENTION

1. Field of the Invention

The present invention relates to an image processing device, an image capture device, an image processing method, and a program for a restoration process based on a point spread function.

2. Description of the Related Art

In an object image photographed through an optical system, a so-called point spread phenomenon in which a point object has minute spread due to the influence of diffraction, aberration, or the like caused by the optical system may be observed. A function representing a response of an optical system to a point light source is called a point spread function (PSF), and is known as a parameter responsible for resolution deterioration of a photographic image.

The photographic image deteriorated in image quality due to the point spread phenomenon can be recovered in image quality through a point image restoration process based on the PSF. The point image restoration process is a process in which a deterioration characteristic (point image characteristic) caused by aberration or the like of a lens is determined in advance, and point spread of the photographic image is cancelled through an image process using a restoration filter according to the point image characteristic.

The restoration filter used for the point image restoration process is designed based on various condition elements (lens type, diaphragm value (F value), zoom magnification, object distance, image height, and the like) which may affect the PSF of the optical system. When the number of types of the condition elements of the restoration filter increases, a strict point image restoration process becomes possible; however, the amount of data of the restoration filter is enlarged, and the storage capacity required for storing the restoration filter becomes excessive. Furthermore, advanced arithmetic processing performance is required for a filtering process (deconvolution operation) of the point image restoration process, and in particular, the importance of simplification and acceleration of the point image restoration process is increasing along with an increase in the number of pixels of image data in recent years.

In regard to the restoration process based on the PSF, for example, JP2010-141661A discloses an image processing device which scales an image trimmed by the magnification of a digital zoom according to a designated size, and performs a restoration process for the scaled image. Furthermore, JP2011-10214A discloses an image processing control method which applies a recovery filter to an image photographed by a camera capable of photographing a moving image and a still image to reduce image deterioration, such as blurring.

SUMMARY OF THE INVENTION

As described above, the importance of "simplification and acceleration of the restoration process" is increasing, and in particular, in a restoration process of images photographed while changing the optical zoom magnification, it is desirable to promote "simplification and acceleration of the restoration process". That is, if the optical zoom magnification varies, the PSF of the photographing optical system also changes, and it is desirable to suggest a new method which can perform a restoration process at a high speed with a simple configuration while reflecting a PSF change accompanied by the variation of the optical zoom magnification in the restoration process. Such a restoration processing method is effective in a restoration process for both a moving image and a still image, and in particular, is beneficial in a restoration process for a moving image photographed while varying the optical zoom magnification.

However, in the device and method described in JP2010-141661A and JP2011-10214A described above, it is difficult to realize simplification and acceleration of the restoration process. That is, in the image processing device of JP2010-141661A, the change of the PSF of the photographing optical system accompanied by the variation of the optical zoom magnification is not considered at all, and in JP2010-141661A, there is no description relating to a restoration process of a moving image and a still image photographed while varying the optical zoom magnification. Similarly, in the image processing control method of JP2011-10214A, the change of the PSF of the photographing optical system accompanied by the variation of the optical zoom magnification is not considered at all. In the paragraph 0085 of the specification of JP2011-10214A, there is a description relating to application of a restoration process to a moving image; however, in JP2011-10214A, there is only a teaching to the effect that "In many cases, the zoom is fixed compared to the diaphragm. Accordingly, a recovery filter used a long time ago may be deleted among recovery filters corresponding to different zooms", and there is no disclosure or suggestion of a specific method of the restoration process for the moving image. In particular, while images (wide angle image/telescopic image) having different image angles are mixed in a moving image acquired by photographing accompanied by the variation of the optical zoom magnification since images (frames) having different optical zoom magnifications at the time of photographing are included, in JP2011-10214A, there is no teaching relating to a restoration process assuming such a case.

In this way, even with the device and method described in JP2010-141661A and JP2011-10214A, it is difficult to realize high-speed processing of a restoration process corresponding to a change in the optical zoom magnification.

In a point image restoration process for a moving image, simplification and acceleration of the process are required compared to a point image restoration process for a still image, and there is a need to meet unique requirements, such as smooth image quality continuity between preceding and succeeding frames. That is, in the point image restoration process for the still image, photographing conditions at the time of photographing may be detected, and the restoration process may be performed using a restoration filter corresponding to the detected photographing conditions. Meanwhile, in the point image restoration process for the moving image, since the photographing conditions may vary during photographing, images (frames) of different photographing conditions may be included in the moving image, if the same restoration process is performed successively corresponding to the varied photographing conditions, a processing load is great, when a real time process is required, acceleration of the process is also required, and smooth image quality continuity between preceding and succeeding frames is also required. Accordingly, it is desirable for a new point image restoration processing method capable of further improving restoration image quality of both of a still image and a moving image in sufficient consideration of characteristics in image quality required for a still image and a moving image.

The invention has been accomplished in consideration of the above-described situation, and an object of the invention is to provide a point image restoration processing technique which can suppress the amount of data of a restoration filter and can be executed with a simple processing configuration.

Another object of the invention is to provide a point image restoration process technique which can be applied to both of a still image and a moving image and can meet requirements in image quality required for a still image and a moving image.

An aspect of the invention relates to an image processing device including a filter application unit which applies a restoration filter based on a point spread function of an optical system to source image data acquired through photographing using the optical system to acquire restored image data, and a gain adjustment unit which performs adjustment of an amplification factor of the difference between the source image data and the restored image data and acquires recovered image data from the difference after the adjustment is performed and the source image data. The filter application unit uses a common filter determined regardless of a value of a magnification of an optical zoom of the optical system as the restoration filter, and the gain adjustment unit determines the amplification factor based on the magnification of the optical zoom of the optical system.

According to this aspect, the common filter with regard to the magnification (optical zoom magnification) of the optical zoom of the optical system is used as the restoration filter, and the amount of data of the restoration filter can be effectively suppressed. Furthermore, according to this aspect, "the deviation of matching between the actual point spread function of the optical system and the common restoration filter" which may occur due to the use of the common restoration filter with regard to the optical zoom magnification can be compensated for by determining "the amplification factor of the difference between the source image data and the restored image data" based on the optical zoom magnification. The amplification factor can be comparatively simply adjusted, and "the deviation of matching between the actual point spread function of the optical system and the common restoration filter" can be simply and effectively eliminated without switching between the restoration filters even if the optical zoom magnification varies. Therefore, according to this aspect, it is possible to simplify the device configuration and to perform the restoration process in a stable state at a high speed.

The image processing device of this aspect can be applied to both of a still image and a moving image (frames), and the amplification factor is appropriately adjusted while using the common restoration filter with regard to the optical zoom magnification, whereby requirements in image quality required for the still image and the moving image can be satisfied.

Preferably, the restoration filter is determined based on a diaphragm value of the optical system for acquiring the source image data.

According to this aspect, the restoration filter which is used in common with regard to the optical zoom magnification is determined based on the diaphragm value, and "the deviation of matching between the actual point spread function of the optical system and the common restoration filter" can be effectively prevented from becoming excessive. Since the influence of the diaphragm value on the point spread function is comparatively great, with the use of the restoration filter based on the point spread function reflecting the diaphragm value, it is possible to improve restoration image quality accuracy.

The "diaphragm value" used herein is an index representing the degree of aperture of the diaphragm of the optical system", and is a value indicating directly or indirectly brightness of an object image reflected on an image capture element through a photographing lens. For example, an "F value (f-number)", an "Av value (aperture value)", or the like can be used as the "diaphragm value".

Preferably, the filter application unit acquires the restored image data using a common filter determined regardless of the value of the magnification of the optical zoom of the optical system as the restoration filter in case where the diaphragm value of the optical system for acquiring the source image data is a value on a diaphragm side smaller than a first diaphragm value, and the gain adjustment unit determines the amplification factor based on the magnification of the optical zoom of the optical system in case where the diaphragm value of the optical system for acquiring the source image data is a value on a diaphragm side smaller than the first diaphragm value.

According to this aspect, in case where the diaphragm value is a value on the small diaphragm side, the restoration filter is used in common with regard to the optical zoom magnification, and the amplification factor is determined based on the optical zoom magnification. In case where the diaphragm value is not a value on the small diaphragm side, the point image restoration process is performed with the optimum restoration filter and amplification factor based on the optical zoom magnification, whereby it is possible to improve image restoration accuracy. Only on the small diaphragm side on which the influence of the optical zoom magnification on the point spread function is comparatively small, the restoration filter is used in common with regard to the optical zoom magnification and the amplification factor is determined based on the optical zoom magnification, whereby it is possible to attain beneficial effects, such as reduction in the amount of data of the restoration filter, simplification of the device, and improvement of restoration accuracy, with good balance.

The "first diaphragm value" used herein is a diaphragm value to be a criterion of "adjusting the amplification factor based on the optical zoom magnification using the common restoration filter with regard to the optical zoom magnification", and can be appropriately determined by an experiment or the like. For example, a diaphragm value which makes an adverse effect of restoration image quality visually inconspicuous in case where the common restoration filter with regard to the optical zoom magnification is used may be determined in advance by an experiment or the like, and the "first diaphragm value" may be set. The first diaphragm value may be determined based on other factors (lens type, diaphragm value, and the like) which may affect the point spread function, and for example, the "first diaphragm values" relating to images (source image data) photographed and acquired through different optical systems (lenses) may be different.

Preferably, the filter application unit selects a filter for use as the restoration filter from among a plurality of filter candidates as a candidate of a common filter determined regardless of the value of the magnification of the optical zoom of the optical system based on the difference between a modulation transfer function of an image height central portion in the optical system on an optical axis or in the vicinity of the optical axis and a modulation transfer function of an image height peripheral portion in the optical system having an image height greater than the image height central portion.

According to this aspect, since "the common restoration filter with regard to the optical zoom magnification" is selected based on the difference between the modulation transfer functions (MTFs) of the image height central portion and the image height peripheral portion, it is possible to perform the point image restoration process reflecting the point image characteristics (MTF characteristics) in the image height central portion and the image height peripheral portion.

Preferably, the plurality of filter candidates include a first filter candidate and a second filter candidate different from the first filter candidate, and the filter application unit uses the first filter candidate as the restoration filter in case where the difference between the modulation transfer function of the image height central portion and the modulation transfer function of the image height peripheral portion is smaller than a first threshold value, and uses the second filter candidate as the restoration filter in case where the difference between the modulation transfer function of the image height central portion and the modulation transfer function of the image height peripheral portion is equal to or greater than the first threshold value.

According to this aspect, the restoration filter is switched between in case where the difference between the MTF of the image height central portion and the MTF of the image height peripheral portion is great and in case where the difference is small, and it is possible to perform the point image restoration process reflecting the point image characteristics in the image height central portion and the image height peripheral portion.

Preferably, in case where the source image data is a moving image, the filter application unit acquires the restored image data using a common filter with regard to the magnification of the optical zoom of the optical system as the restoration filter, and in case where the source image data is a moving image, the gain adjustment unit determines the amplification factor based on the magnification of the optical zoom of the optical system.

According to this aspect, "the use of the common restoration filter with regard to the optical zoom magnification" and "the adjustment of the amplification factor according to the optical zoom magnification" are performed for a moving image where the photographing conditions may vary during photographing, and in the point image restoration process for each of a plurality of images (source image data) constituting the moving image, it is possible to obtain beneficial functional effects, such as reduction in the amount of data of the restoration filter, simplification of the device, and improvement of restoration accuracy.

The "moving image" used herein is constituted of an image group (frame group) continuous over time, and includes a series of a plurality of time-series images photographed and acquired in a comparatively short period of time, and for example, a recorded moving image recorded in a memory or the like or a live view image (Live Preview) can be included in the concept of the "moving image".

Preferably, in case where the source image data is a still image, the filter application unit acquires the restored image data using the restoration filter determined based on the magnification of the optical zoom of the optical system.

According to this aspect, in contrast with the restoration process of the moving image where the photographing conditions may vary during photographing, in the restoration process for the still image in which the restoration filter according to the photographing conditions at the time of photographing is preferably used, since the restoration filter reflecting the point spread function based on the optical zoom magnification is used, instead of the common restoration filter with regard to the optical zoom magnification, it is possible to improve restoration image accuracy.

The "still image" used herein is basically constituted of a single image, and is an image which can be provided as a single image.

Preferably, in case where the source image data is acquired by still image photographing during moving image photographing, the filter application unit acquires the restored image data using the restoration filter determined based on the magnification of the optical zoom of the optical system.

According to this aspect, in the restoration process for the still image photographed during moving image photographing, since the restoration filter reflecting the point spread function based on the optical zoom magnification is used, instead of the common restoration filter with regard to the optical zoom magnification, it is possible to improve restoration image accuracy. Meanwhile, in the restoration process for the moving image, since the amplification factor is adjusted based on the optical zoom magnification while using the common restoration filter with regard to the optical zoom magnification, it is possible to achieve simplification and acceleration of the process without damaging to continuity of image quality between continuous images. In this way, according to this aspect, requirements in image quality required for a still image and a moving image can be effectively satisfied.

Preferably, the optical system has a lens unit which modulates a phase to extend a depth of field.

According to this aspect, in a restoration process of source image data obtained through a so-called extended depth of field (focus) (EDoF) optical system, it is possible to reduce the amount of data of a restoration filter, to simplify the device, and to restore an image with excellent accuracy. A method (optical phase modulation means) of modulating a phase in the lens unit is not particularly limited, and a phase modulation unit may be provided between lenses, or a lens itself (for example, an incidence surface and/or an output surface of a lens) may have a phase modulation function.

Another aspect of the invention relates to an image capture device including an image capture element which acquires source image data by photographing using an optical system, and the above-described image processing device.

According to this aspect, even in the restoration process in the image capture device, it is possible to reduce the amount of data of the restoration filter, to simplify the device configuration, and to perform the restoration process in a stable state at a high speed. This aspect is particularly effective for an image capture device in which restrictions of system design are comparatively strict. Accordingly, this aspect is suitable for an image capture device in which memory capacity for storing data relating to the point spread function or the restoration filter is restricted (for example, an image capture device which stores data in a memory on a memory unit side in a lens interchangeable camera), or an image capture device in which processing performance of an arithmetic processing device (CPU or the like) performing a complicated filtering process (deconvolution operation) or the like is restricted (for example, an image capture device in which a restoration process operation is performed by a control unit in the camera body or the lens unit with a limited installation space).

Preferably, the image capture device further includes a zoom control unit which is able to switch between an optical zoom and a digital zoom, and the magnification of the optical zoom to be a criterion for switching between the optical zoom and the digital zoom is determined based on the point spread function of the optical system.

According to this aspect, since the magnification of the optical zoom to be a criterion of switching between the optical zoom and the digital zoom is determined based on the point spread function of the optical system, it is possible to switch between the optical zoom and the digital zoom in consideration of an adverse effect (overcorrection, ringing, or the like) in the recovered image data which may be caused by the optical zoom magnification. For example, the optical zoom magnification immediately before an adverse effect (overcorrection, ringing, or the like) in the recovered image data starts visually conspicuous can be set as a switching point of the optical zoom and the digital zoom.

The "optical zoom" used herein is a method of controlling optical zoom means (zoom lens or the like) to perform zooming, and an image angle or a focal distance is also adjusted. Meanwhile, the "digital zoom" is a method of changing an image range through an image process principally to perform zooming without depending on optical zoom means (zoom lens or the like), and may be generally performed by enlarging a part of the image reflected on the image capture element.

Preferably, the magnification of the optical zoom to be a criterion for switching between the optical zoom and the digital zoom is determined based on the difference between a modulation transfer function of an image height central portion in the optical system on an optical axis or in the vicinity of the optical axis and a modulation transfer function of an image height peripheral portion in the optical system having an image height greater than the image height central portion.

According to this aspect, since the criterion of switching between the optical zoom and the digital zoom is changed between in case where the difference between the MTF of the image height central portion and the MTF of the image height peripheral portion is great and in case where the difference is small, it is possible to perform "switching between the optical zoom and the digital zoom" based on the point image characteristics in the image height central portion and the image height peripheral portion.

Preferably, the magnification of the optical zoom to be a criterion for switching between the optical zoom and the digital zoom is determined based on a zoom direction for acquiring the source image data.

According to this aspect, it is possible to smoothly switch between the optical zoom and the digital zoom based on the zoom direction for acquiring the source image data.

Preferably, the gain adjustment unit determines the amplification factor based on a zoom direction for acquiring the source image data.

According to this aspect, since the amplification factor is determined based on the zoom direction for acquiring the source image data, it is possible to effectively maintain continuity among a plurality of images constituting a moving image based on the zoom direction, in particular, at the time of moving image photographing.

Still another aspect of the invention relates to an image processing method including a filter application step of applying a restoration filter based on a point spread function of an optical system to source image data acquired through photographing using the optical system to acquire restored image data, and a gain adjustment step of performing adjustment of an amplification factor of the difference between the source image data and the restored image data and acquiring recovered image data from the difference after the adjustment is performed and the source image data. In the filter application step, a common filter with regard to a magnification of an optical zoom of the optical system is used as the restoration filter, and in the gain adjustment step, the amplification factor is determined based on the magnification of the optical zoom of the optical system.

Still another aspect of the invention relates to a program which causes a computer to execute a procedure for applying a restoration filter based on a point spread function of an optical system to source image data acquired through photographing using the optical system to acquire restored image data, and a procedure for performing adjustment of an amplification factor of the difference between the source image data and the restored image data and acquiring recovered image data from the difference after the adjustment is performed and the source image data. In the procedure for acquiring the restored image data, a common filter with regard to a magnification of an optical zoom of the optical system is used as the restoration filter, and in the procedure for acquiring the recovered image data, the amplification factor is determined based on the magnification of the optical zoom of the optical system.

According to the invention, the common filter with regard to the optical zoom magnification is used as the restoration filter, and it is possible to effectively suppress the amount of data of the restoration filter. Furthermore, the amplification factor of the difference between the source image data and the restored image data is determined based on the magnification of the optical zoom of the optical system, and it is possible to perform the restoration process at a high speed with a simple device configuration.

According to the invention, with a simple method which appropriately adjusts the amplification factor while using the common restoration filter with regard to the optical zoom magnification, in a point image restoration process which can be applied to both of a still image and a moving image, requirements in image quality required for a still image and a moving image can be satisfied.

BRIEF DESCRIPTION OF THE DRAWINGS

FIG. 5A is a graph before the point image restoration process, and FIG. 5B is a graph after the point image restoration process.

DESCRIPTION OF THE PREFERRED EMBODIMENTS

An embodiment of the invention will be described referring to the accompanying drawings. In the following embodiment, as an example, a case where the invention is applied to a digital camera (image capture device) which is connectable to a computer (personal computer (PC)) will be described.

Figure 1:
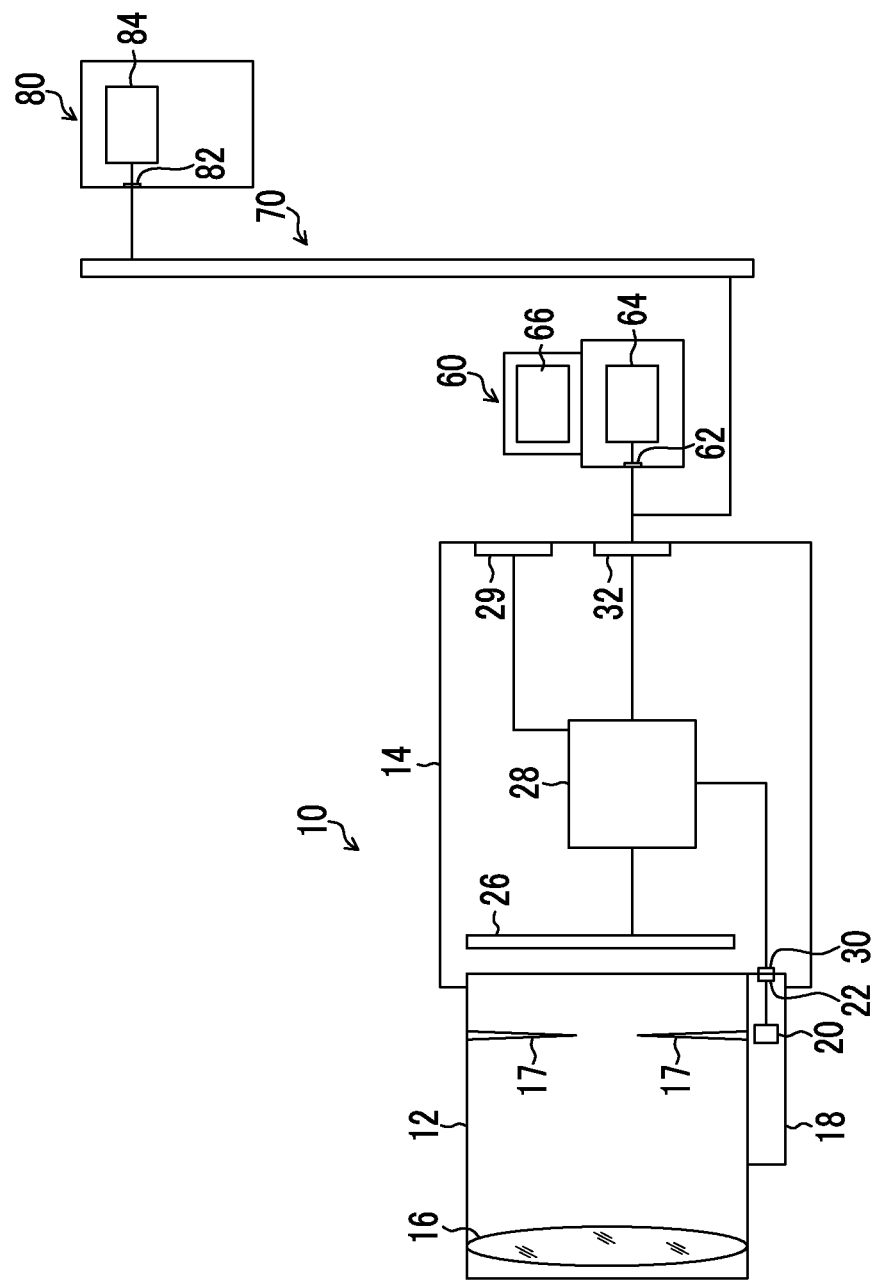
FIG. 1 is a block diagram showing a digital camera which is connected to a computer.

FIG. 1 is a block diagram showing a digital camera which is connected to a computer.

A digital camera 10 includes an interchangeable lens unit 12, and a camera body 14 including an image capture element 26, and the lens unit 12 and the camera body 14 are electrically connected through a lens unit input/output unit 22 of the lens unit 12 and a camera body input/output unit 30 of the camera body 14.

The lens unit 12 includes an optical system, such as a lens 16 or a diaphragm 17, and an optical system operating unit 18 which controls the optical system. The optical system operating unit 18 includes a lens unit controller 20 which is connected to the lens unit input/output unit 22, and an actuator (not shown) which operates the optical system. The lens unit controller 20 controls the optical system through an actuator based on a control signal sent from the camera body 14 through the lens unit input/output unit 22, and performs, for example, focus control or zoom control by movement of a lens (including a focus lens and a zoom lens), diaphragm amount control of the diaphragm 17, and the like.

The image capture element 26 of the camera body 14 has a condensing microlens, a color filter of R (red), G (green), and B (blue), or the like, and an image sensor (a photodiode: a complementary metal oxide semiconductor (CMOS), a charge coupled device (CCD), or the like), and acquires source image data by photographing an object image using the optical system. That is, the image capture element 26 converts light of an object image emitted through the optical system (the lens 16, the diaphragm 17, or the like) of the lens unit 12 to an electrical signal, and sends an image signal (source image data) to a camera body controller 28.

Figure 2:
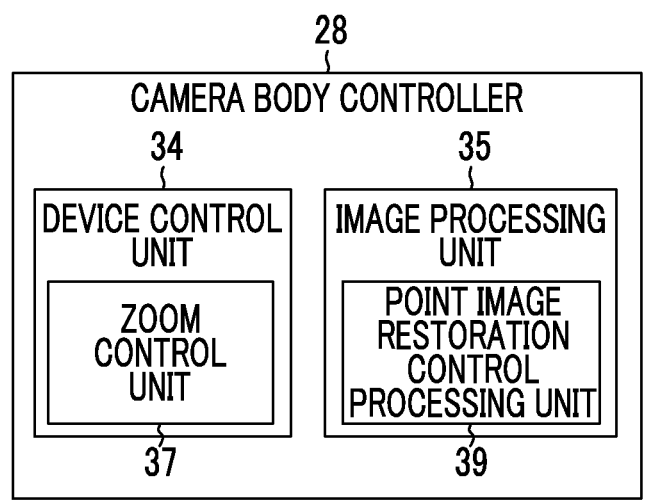
FIG. 2 is a block diagram showing a functional configuration example of a camera body controller.

As shown in FIG. 2, the camera body controller 28 has a device control unit 34 and an image processing unit (image processing device) 35, and integrally controls the camera body 14. For example, the device control unit 34 controls the output of the image signal (image data) from the image capture element 26, generates a control signal for controlling the lens unit 12 and transmits the control signal to the lens unit 12 (lens unit controller 20) through a camera body input/output unit 30, and transmits image data (RAW data, JPEG data, or the like) after an image process to external devices (a computer 60 and the like) connected through an input/output interface 32. The device control unit 34 appropriately controls various devices in the digital camera 10, such as a display unit (not shown) (an electronic view finder (EVF) or a rear liquid crystal display unit).

The device control unit 34 of this example has a zoom control unit 37 (see FIG. 2). For example, the zoom control unit 37 transmits a control signal for controlling moving of a zoom lens (not shown) held by the lens unit 12 to the lens unit controller 20 through the camera body input/output unit 30 and a lens unit input/output unit 22 and controls optical zoom magnification. The zoom control unit 37 is configured to switch between an optical zoom and a digital zoom, and determines the magnification of the optical zoom to be a criterion of switching between the optical zoom and the digital zoom based on the point spread function of the optical system (a lens 16 and a diaphragm 17). The zoom control unit 37 controls the whole of a zoom process, such as creation of a zoom image at the time of digital zoom operation. The details of zoom control in the zoom control unit 37 will be described below.

The image processing unit 35 can perform an arbitrary process for the image signal from the image capture element 26 as necessary. For example, various image processes, such as a sensor correction process, a demosaic (synchronization) process, a pixel interpolation process, a color correction process (an offset correction process, a white balance process, a color matrix process, a gamma conversion process (a gamma correction processing unit 33)), an RGB image process (a sharpness process, a tone correction process, an exposure correction process, a contour correction process, and the like), an RGB/YCrCb conversion process, and an image compression process, are appropriately performed in the image processing unit 35.

The image processing unit 35 of this example includes a point image restoration control processing unit 39 (see FIG. 2) which subjects the image signal (source image data) to the restoration process (point image restoration process) based on the point spread function of an optical system. The format of source image data to be subjected to the point image restoration process is not particularly limited, and may be, for example, color component data (color component signals of RGB or the like) or may be luminance data. The details of the point image restoration process in the point image restoration control processing unit 39 will be described.

The digital camera 10 shown in FIG. 1 includes other devices (a shutter and the like) necessary for photographing or the like, and the user can appropriately determine and change various settings (exposure value (EV value) and the like) for photographing or the like through a user interface 29 in the camera body 14. The user interface 29 is connected to the camera body controller 28 (the device control unit 34 and the image processing unit 35), and various settings determined and changed by the user are reflected in various processes in the camera body controller 28.

Image data subjected to the image process in the camera body controller 28 is sent to the computer 60 and the like connected to the input/output interface 32. The format of image data sent from the digital camera 10 (camera body controller 28) to the computer 60 and the like is not particularly limited, and an arbitrary format, such as RAW, JPEG, or TIFF, may be used. Accordingly, the camera body controller 28 may constitute header information (photographing information (photographing date and time, model, pixel number, diaphragm value, and the like)), main image data, and thumbnail image data as one image file in association with each other, like a so-called exchangeable image file format (Exif), and may transmit the image file to the computer 60.

The computer 60 is connected to the digital camera 10 through the input/output interface 32 of the camera body 14 and a computer input/output unit 62, and receives data, such as image data, sent from the camera body 14. A computer controller 64 integrally controls the computer 60, subjects image data from the digital camera 10 to an image process, and controls communication with a server 80 or the like connected to the computer input/output unit 62 through a network line, such as the Internet 70. The computer 60 has a display 66, and the process content or the like in the computer controller 64 is displayed on the display 66 based on the needs. The user operates input means (not shown), such as a keyboard, while confirming the display of the display 66, thereby inputting data or commands to the computer controller 64. With this, the user can control the computer 60 or the devices (the digital camera 10 and the server 80) connected to the computer 60.

The server 80 has a server input/output unit 82 and a server controller 84. The server input/output unit 82 constitutes a transmission/reception connection unit with the external devices, such as the computer 60, and is connected to the computer input/output unit 62 of the computer 60 through the network line, such as the Internet 70. The server controller 84 cooperates with the computer controller 64 according to a control instruction signal from the computer 60, performs transmission/reception of data with the computer controller 64 based on the needs, downloads data to the computer 60, and performs a calculation process and transmits the calculation result to the computer 60.

Each controller (the lens unit controller 20, the camera body controller 28, the computer controller 64, and the server controller 84) has circuits necessary for a control process, and includes, for example, an arithmetic processing circuit (CPU or the like), a memory, and the like. Communication among the digital camera 10, the computer 60, and the server 80 may be performed in a wired manner or in a wireless manner. The computer 60 and the server 80 may be constituted integrally, and the computer 60 and/or the server 80 may be omitted. A communication function with the server 80 may be provided in the digital camera 10, and transmission/reception of data may be performed directly between the digital camera 10 and the server 80.

<Point Image Restoration Process>

Next, a point image restoration process of captured data (image data) of an object image obtained through the image capture element 26 will be described.

In the following example, although a case where the point image restoration process is carried out in the camera body 14 (the camera body controller 28) will be described, the whole or a part of the point image restoration process may be carried out in another controller (the lens unit controller 20, the computer controller 64, the server controller 84, or the like).

The point image restoration process is a process which subjects source image data acquired from the image capture element 26 by photographing the object image using the optical system (the lens 16, the diaphragm 17, or the like) to a restoration process using a restoration filter based on a point spread function of the optical system to acquire recovered image data.

That is, in order to restore the original object image (point image) from source image data of the blurred image, source image data is subjected to a point image restoration process using a restoration filter, whereby recovered image data representing an image (recovered image) closer to the original object image (point image) is obtained.

The restoration filter for use in the point image restoration process is obtained from point image information (point spread function) of the optical system according to the photographing conditions at the time of acquiring source image data by a predetermined restoration filter calculation algorithm. Since the point image information (point spread function) of the optical system fluctuates depending on various photographing conditions, such as a diaphragm amount, a focal distance, a zoom amount, an image height, a recording pixel number, and a pixel pitch, as well as the type of lens 16, for calculating the restoration filter, the photographing conditions are acquired.

The restoration filter F on an actual space constituted of, for example, N×M (where N and M are integers equal to or greater than two) taps is applied to image data to be processed, and weighted average calculation (deconvolution calculation) of a filter coefficient allocated to each tap and corresponding pixel data (pixel data to be processed of source image data and adjacent pixel data) is performed, whereby pixel data (recovered image data) after the point image restoration process can be calculated. The weighted average process using the restoration filter is applied to all pixel data constituting image data while changing a target pixel in order, thereby performing the point image restoration process.

The restoration filter on the actual space constituted of the N×M taps can be derived by inverse Fourier transform of a restoration filter on a frequency space. Accordingly, the restoration filter on the actual space can be appropriately calculated by specifying a restoration filter on the frequency space as the basis and designating the number of taps constituting the restoration filter on the actual space. The restoration filter on the frequency space may be used, instead of the restoration filter on the actual space, and the point image restoration process may be performed by applying the restoration filter to the image data on the frequency space.

The point image restoration control processing unit 39 (see FIG. 2) carries out the above-described point image restoration process for photographic image data (source image data) acquired by the image capture element 26 through photographing using the optical system (the lens 16, the diaphragm 17, or the like), and generates and outputs recovered image data.

Figure 3:
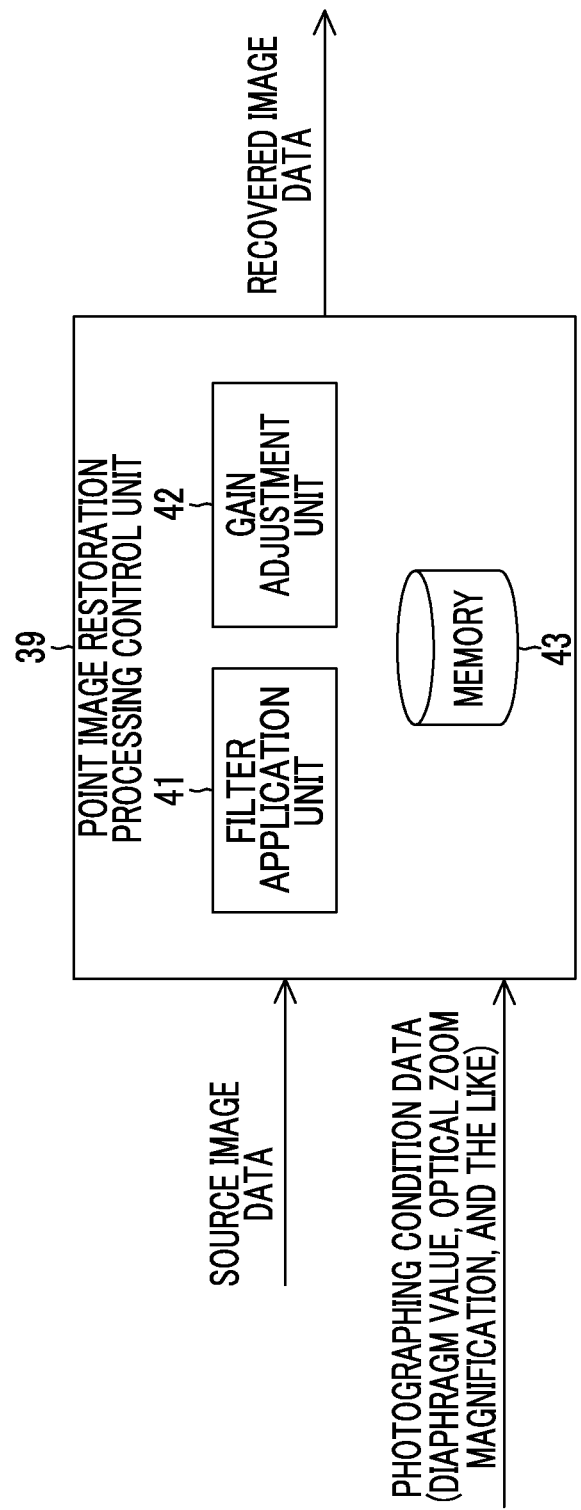
FIG. 3 is a functional block diagram showing an example of a point image restoration control processing unit.

FIG. 3 is a functional block diagram showing an example of the point image restoration control processing unit 39. The point image restoration control processing unit 39 of this example has a filter application unit 41, a gain adjustment unit 42, and a memory 43.

The filter application unit 41 applies the restoration filter based on the point spread function based on the optical system (the lens 16, the diaphragm 17, or the like) to source image data, and acquires restored image data. That is, the filter application unit 41 acquires source image data and photographing condition data, acquires a restoration filter corresponding to photographing condition data of source image data, and applies the acquired restoration filter to source image data to acquire restored image data. The gain adjustment unit 42 performs adjustment of an amplification factor (restoration gain) of the difference between source image data and restored image data, and acquires recovered image data from the difference after the adjustment is performed and source image data. Various kinds of data (restoration filter, point spread function, and the like) for use in the filter application unit 41 and the gain adjustment unit 42 are stored in the memory 43, and the filter application unit 41 and the gain adjustment unit 42 can appropriately read data stored in the memory 43.

Figure 4:
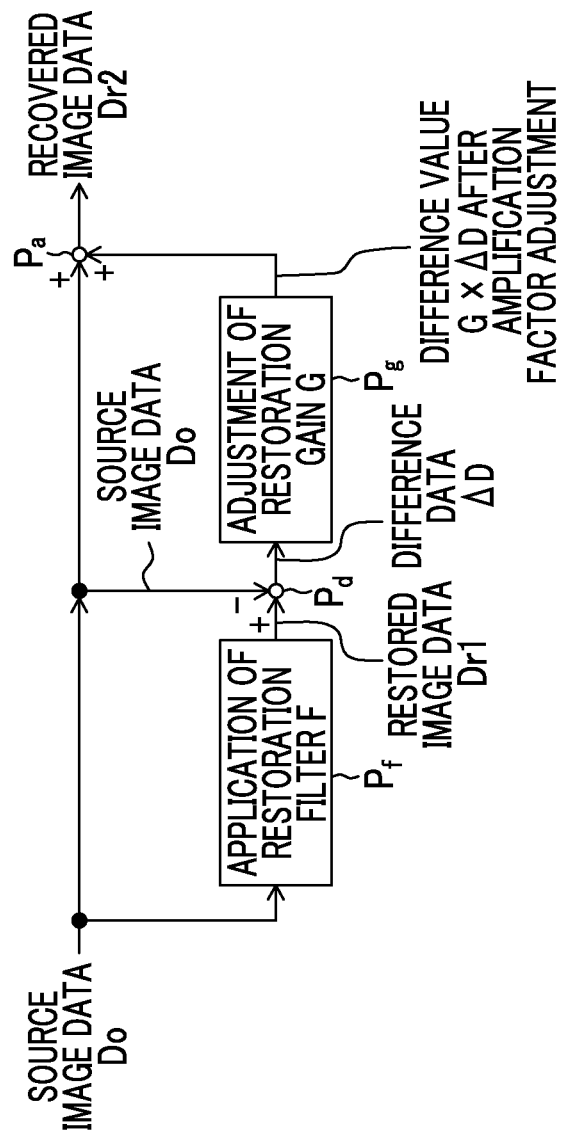
FIG. 4 is a control circuit diagram showing an example of a point image restoration process (filter application process and gain adjustment process) which is performed by a filter application unit and a gain adjustment unit.

FIG. 4 is a control circuit diagram showing an example of the point image restoration process (filter application process and gain adjustment process) which is performed by the filter application unit 41 and the gain adjustment unit 42.

In the point image restoration process in the point image restoration control processing unit 39, first, in the filter application unit 41, the restoration filter F is applied to source image data Do (filter application process $P_f$), and restored image data Dr1 is calculated. The restoration filter F which is applied to source image data Do is not particularly limited as long as the restoration filter F is based on the point spread function of the optical system (the lens 16, the diaphragm 17, or the like). Accordingly, a plurality of restoration filters F may be stored in the memory 43, and the restoration filter F corresponding to photographing condition data of source image data Do may be read by the filter application unit 41, or the filter application unit 41 may calculate the corresponding restoration filter F based on photographing condition data of source image data Do and the point spread function.

The restoration filter F may be based on the point spread function directly or indirectly, and may be a filter for restoring only an amplitude component or a phase component of source image data to obtain recovered image data, or may be a filter for restoring the amplitude component and the phase component of source image data to obtain recovered image data. That is, a restoration filter can be calculated based on at least one of a modulation transfer function (MTF) and a phase transfer function (PTF) of the optical system. The blur characteristics of the optical system can be expressed by a so-called optical transfer function (OTF), and a function which is obtained by subjecting the OTF to inverse Fourier transform is called a point spread function (PSF). The MTF is an absolute value component of the OTF, and the PTF represents a phase shift as a function of a spatial frequency. Accordingly, the restoration filter F which is used for the point image restoration process can be appropriately designed based on the OTF (MTF/PTF) or the PSF of the optical system.

Thereafter, in the gain adjustment unit 42, the difference of image data before and after the filter application process is derived (difference derivation process $P_d$), and the adjustment of the amplification factor (restoration gain) to the difference is performed (gain adjustment process $P_g$). That is, as shown in FIG. 4, in the difference derivation process $P_d$, difference data $\Delta D$ ($\Delta D = Dr1 - Do$) between restored image data Dr1 passing through the filter application process $P_f$ and source image data Do is calculated. In the gain adjustment process $P_g$, the adjustment of the amplification factor (restoration gain) G of difference data $\Delta D$ is performed to calculate the difference value ($G \times \Delta D$) after amplification factor adjustment, and an addition process $P_a$ of the difference value ($G \times \Delta D$) after amplification factor adjustment and source image data Do is performed to calculate recovered image data Dr2 ($Dr2 = Do + G \times \Delta D$). As the point image restoration process (the filter application process and the gain adjustment process) which is performed by the filter application unit 41 and the gain adjustment unit 42, another method similar to the above-described method may be used. For example, in the filter application unit 41, the restoration filter F is applied to source image data Do (filter application process $P_f$), and restored image data Dr1 is calculated. Thereafter, in the gain adjustment unit 42, as the gain adjustment process $P_g$, the adjustment of the amplification factor (restoration gain) G to restored image data Dr1 is performed ($Dr1 \times G$), and the addition process $P_a$ of this value and a value obtained by multiplying source image data Do by $(1-G)$ may be performed to calculate recovered image data Dr2.

In this way, the restoration intensity of the point image restoration process fluctuates based on the restoration filter (filter coefficient) F in the filter application process $P_f$ and the restoration gain G in the gain adjustment process $P_g$. For this reason, the restoration intensity of the point image restoration process can be adjusted by "switching the restoration filter (filter coefficient) for use in the filter application process $P_f$" and/or "changing the restoration gain G in the gain adjustment process $P_g$".

Accordingly, for example, a process for "lowering the restoration intensity of the point image restoration process" can include "a filter application process $P_f$ using another restoration filter (filter coefficient) with which restored image data Dr1 having a small difference from source image data is obtained (the degree of restoration is weak) compared to a case where a normal restoration filter is used" and "a gain adjustment process $P_g$ using another amplification factor with which the difference value ($G \times \Delta D$) after amplification factor adjustment is small (the degree of amplification is weak) compared to a case where a normal restoration gain G is used". The point image restoration control processing unit 39 performs at least one of these processes (filter switching process and amplification factor change process), thereby adjusting the restoration intensity of the point image restoration process.

Figure 5A:
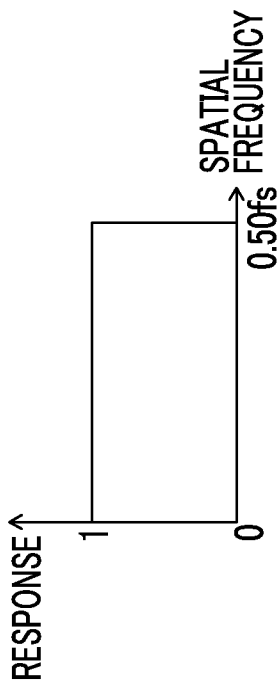
FIGS. 5A and 5B are graphs showing a relationship example of "spatial frequency-response" of image data when an ideal point image restoration process is performed.
Figure 5B:
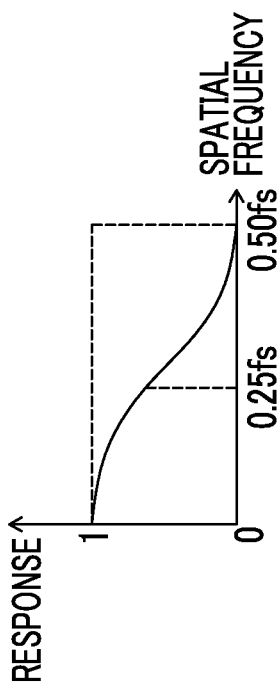

FIGS. 5A and 5B are graphs showing a relationship example of "spatial frequency-response" of image data when an ideal point image restoration process is performed, FIG. 5A shows a graph before the point image restoration process, and FIG. 5B shows a graph after the point image restoration process.

The "spatial frequency" represented by the horizontal axis of FIGS. 5A and 5B is normalized by a sampling frequency, indicates a high frequency toward the right side on the paper surface ("0.5 fs": see a Nyquist frequency), and indicates a low frequency toward the left side. The "response" represented by the vertical axis of FIGS. 5A and 5B indicates the ratio of "actually obtained image data" to "original image data" before affected by the point spread phenomenon. Accordingly, "response=1" indicates that "actually obtained image data" is the same as "original image data", and "response=0" indicates that "actually obtained image data" is "0 (zero)" regardless of "original image data". Various elements representing deterioration characteristics due to the point spread phenomenon in image data can be used as the basis of "response", and for example, "response" can be expressed based on the MTF representing the resolution characteristics.

As shown in FIG. 5A, actually obtained image data has a tendency that the response becomes equal to or less than "1" due to the influence of the point spread phenomenon, and in particular, degradation of the response is conspicuous in image data on a high frequency side. The point image restoration process is a process for restoring image data degraded in the response due to the point spread phenomenon to original image data, and ideally, a process for recovering image data such that "response=1" over the entire spatial frequency as shown in FIG. 5B. Since the relationship of "spatial frequency-response" of image data fluctuates due to the characteristics of the individual optical system (the lens 16, the diaphragm 17, or the like), the relationship shown in FIG. 5A is not necessarily established, and the restoration filter F and the restoration gain G are designed such that image data of desired response (for example, "response=1") is obtained in consideration of individual optical characteristics.

Next, the relationship between "zoom magnification (zoom position) of optical zoom" and "response" will be described.

Figure 6:
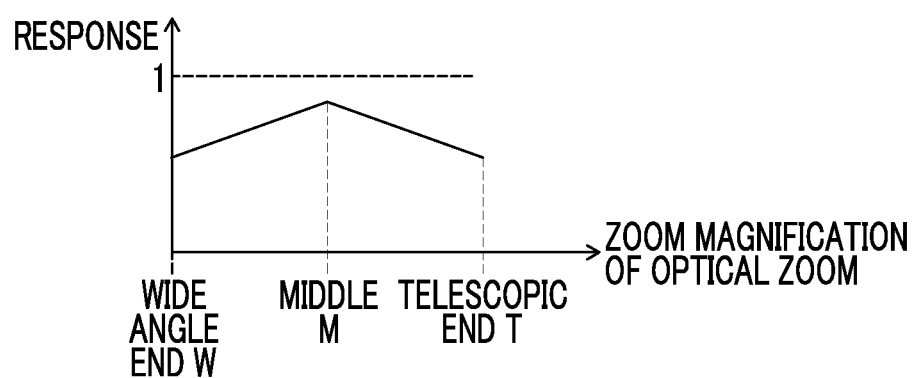
FIG. 6 is a graph showing a relationship example of "zoom magnification of an optical zoom-response" of image data.

FIG. 6 is a graph showing a relationship example of "zoom magnification of an optical zoom-response" of image data, and shows the relationship at a spatial frequency (for example, "spatial frequency=0.25 fs" (see FIG. 5A)) representing the resolution characteristics of the optical system (the lens 16). The horizontal axis of FIG. 6 is based on "zoom magnification (zoom position) of optical zoom", indicates a telescopic zoom side (see "telescopic end T" of FIG. 6) toward the right side on the paper surface, and indicates a wide angle zoom side (see "wide angle end W" of FIG. 6) toward the left side. The vertical axis of FIG. 6 is based on "response" of image data, and is the same as "response" on the vertical axis of FIGS. 5A and 5B. In FIG. 6, the "wide angle end W" corresponds to, for example, "focal distance=24 mm", a "middle M" corresponds to, for example, "focal distance=60 mm", and the "telescopic end T" corresponds to, for example, "focal distance=120 mm".

In the digital camera 10 which has an optical zoom function capable of changing the zoom magnification of the optical zoom, the resolution of the optical system (lens 16) tends to be degraded when the zoom magnification of the optical zoom is closer to the zoom end (see "wide angle end W" and "telescopic end T" of FIG. 6). For this reason, as shown in FIG. 6, the response in the zoom end portion is low compared to the zoom magnification (see "middle M" of FIG. 6) of the middle, and in many cases, the response is gradually degraded toward the zoom end.

The influence of optical zoom magnification on the point spread function (PSF or the like) of the optical system is comparatively small, and in particular, the influence of optical zoom magnification becomes small on a small diaphragm side with a great F value.

In this example, in addition to the knowledge described above, in the filter application unit 41, a common filter with regard to the magnification of the optical zoom of the optical system is used as the restoration filter, whereby memory efficiency is improved and the process is simplified. In the gain adjustment unit 42, the restoration gain is determined based on the magnification of the optical zoom of the optical system, whereby "the deviation of matching between the actual point spread function and the restoration filter" is compensated for to optimize recovered image data.

In general, the filtering process using the restoration filter has a large amount of calculation, and when the types of parameters (condition elements) of the restoration filter increases, the amount of data of the restoration filter (filter coefficient) increases. For this reason, the total amount of data of a restoration filter group designed based on all condition elements becomes excessive, and it may be actually difficult to store the restoration filter group having an excessive amount of data in the memory since simplification of the process or flexible circuit design is obstructed. Accordingly, as in this example, the use of the common restoration filter with regard to optical zoom magnification leads to effective reduction in the amount of data of the restoration filter, and is significantly useful from the viewpoint of simplification of the process and reduction in circuit scale.

In a moving image, since continuity between frames is one of factors responsible for image quality, the frames should be connected such that an excessive change in image quality between the frames is prevented and an image changes smoothly. Accordingly, if a restoration process using an individual restoration filter is performed for each frame, restoration image quality of each frame is improved; however, for example, continuity of image quality between the frames collapses according to the parameters in use in a scene where the photographing conditions fluctuate successively during photographing. In particular, when zoom magnification changes continuously during photographing of a moving image, it is assumed that a moving image is likely to become a restored moving image with lack uniformity as a whole may be obtained. Meanwhile, as in this example, the common filter with regard to optical zoom magnification is used as the restoration filter, whereby continuity of image quality between the frames after the restoration process hardly collapses, and even if zoom magnification changes continuously during photographing of a moving image, a moving image with uniformity as a whole is likely to be generated.

As described above, according to the point image restoration control processing unit 39 (the filter application unit 41 and the gain adjustment unit 42) of this example, fluctuation of the point spread function (resolution of recovered image data) accompanied by a change in zoom magnification is compensated for by the adjustment of the restoration gain without changing the restoration filter, image quality of recovered image data can be kept unchanged regardless of zoom magnification. Image resolution changes depending on optical zoom magnification; however, in the point image restoration process of this example, change in image resolution is absorbed by adjusting the restoration gain. Insufficient restoration intensity due to the filtering process using the common restoration filter is compensated for by the adjustment of the restoration gain, whereby it is possible to prevent the fluctuation of image resolution accompanied by a change in optical zoom magnification.

<Restoration Filter>

The "common restoration filter" for use in the restoration process of this example is provided in common with regard to the zoom magnification of the optical zoom of the optical system (zoom lens); however, the common restoration filter may be changed based on "parameters other than zoom magnification" affecting the point spread function of the optical system. That is, when parameters other than zoom magnification change and the fluctuation of the point spread function is hardly compensated for by the adjustment of the restoration gain, it is preferable to compensate for the fluctuation of the point spread function (resolution of recovered image data) by adjusting the restoration filter.

For example, the restoration filter (filter coefficient) reflecting all or a part of the condition elements, such as the type of optical system (the lens 16 or the diaphragm 17), the diaphragm value, and the object distance, can be used as the "common restoration filter", and in particular, the influence of the "type of optical system" and the "diaphragm value" on the point spread function is comparatively great. Accordingly, it is preferable that a restoration filter corresponding to each of the "type of optical system" and the "diaphragm value" usable in the digital camera 10 (image capture device) can be used as the "common restoration filter".

For example, it is possible to determine a restoration filter based on the "diaphragm value (F value or the like)" of the optical system for acquiring source image data, and the restoration filter is shared in common when optical zoom magnification fluctuates under a condition that the diaphragm value is not changed, whereby it is possible to simplify the process configuration. For example, a restoration filter optimized individually for each F value (diaphragm value) may be calculated or stored in the memory, and when the photographing F value of source image data is changed, a point image restoration process may be performed while switching among the restoration filters based on the photographing F value. In this way, a restoration filter is selected from among candidates (a plurality of filter candidates) of a common restoration filter with regard to optical zoom magnification according to the condition elements (the type of optical system, the diaphragm value, and the like) other than optical zoom magnification, and the point image restoration process may be used.

The restoration filter (filter coefficient) optimized based on the diaphragm value (F value) does not need to be different with all diaphragm values, and may be calculated or stored corresponding to a discrete diaphragm value. If restoration filters are prepared for all diaphragm values, since the number of parameters for determining the individual restoration filters increases and the amount of data also increases, it is not necessarily preferable from the viewpoint of simplification of the process and reduction in the amount of data. Accordingly, a restoration filter may be set for each F value (for example, an arbitrary F value among F1, F1.4, F2, F2.8, F4, F5.6, F8, F11, F16, F22, and F32) usable in the digital camera 10, or a restoration filter may be set for each representative discrete F value usable in the digital camera 10.

When the number of parameters (condition elements) for determining the common restoration filter increases, restoration accuracy is enhanced, and the amount of data of the common restoration filter increases. Meanwhile, when the number of parameters for determining the common restoration filter decreases, the amount of data of the common restoration filter is reduced; however, restoration accuracy is hardly enhanced. In this way, since advantages are changed according to the parameters for determining the common restoration filter, at the time of actual filter design, the parameters of the common restoration filter may be determined in consideration of user's needs or an allowable range on the system. The parameters of the common restoration filter are determined in consideration of the influence on the point spread function, whereby it is possible to achieve both reduction in the amount of data of the restoration filter and improvement of image quality restoration accuracy of the restoration process with good balance.

For example, "sharing of the restoration filter relating to the zoom magnification of the optical zoom in common" may be performed for each of "all diaphragm values (F values)" which can be set in the digital camera 10; however, in particular, "sharing of the restoration filter relating to the zoom magnification of the optical zoom in common" may be performed only for "the diaphragm value (F value) on the small diaphragm side". In general, the influence of zoom magnification on the point spread function of the optical system tends to be small when the diaphragm value becomes a value on the small diaphragm side. Accordingly, "sharing of the restoration filter relating to the zoom magnification of the optical zoom" may be performed only for the diaphragm value on the small diaphragm side on which the influence of optical zoom magnification on the point spread function is comparatively small, and a restoration filter with regard to the zoom magnification of the optical zoom may not be shared in common for the diaphragm value with a comparatively great influence of optical zoom magnification to the point spread function.

In this case, "the diaphragm value on the small diaphragm side" on which the restoration filter with regard to the zoom magnification of the optical zoom is shared in common may be appropriately determined based on the change in the characteristics of the point spread function with respect to the optical zoom magnification, and "sharing of the restoration filter relating to the zoom magnification of the optical zoom" may be performed within a range of diaphragm values in which the change in the characteristics of the point spread function is comparatively small. "The diaphragm value on the small diaphragm side on which the restoration filter is shared in common" can be appropriately set based on photographic image data or the characteristic tendency of the optical system in use. For example, "a specific diaphragm value (for example, a diaphragm value equal to or greater than "F8") derived by an experiment or the like" may be set as "the diaphragm value on the small diaphragm side on which the restoration filter is shared in common", or "diaphragm values (for example, "a maximum F value (a diaphragm value on the smallest diaphragm side) to an F value on a three-stage diaphragm opening side") in a predetermined range of the diaphragm values on the smallest diaphragm side to the diaphragm opening side in system design of the digital camera 10 (image capture device)" may be set as "the diaphragm value on the small diaphragm side on which the restoration filter is shared in common". "The diaphragm value on the small diaphragm side on which the restoration filter is shared in common" may be determined in advance or may be appropriately determined and changed by the user. When the user determines and changes "the diaphragm value on the small diaphragm side on which the restoration filter is shared in common", the range of "the diaphragm value on the small diaphragm side on which the restoration filter is shared in common" is designated through the user interface 29 (see FIG. 1), and information of the designated diaphragm value range may be sent from the camera body controller 28 (point image restoration control processing unit 39) as the range of "the diaphragm value on the small diaphragm side on which the restoration filter is shared in common".

Sharing of the restoration filter relating to the zoom magnification of the optical zoom can be applied to not only a case where a single restoration filter is used in common and a case where a plurality of restoration filters (a set of restoration filters) are used in common. For example, when a restoration filter is set based on an image height or a position in an image, in a point image restoration process for one image (source image data), a plurality of restoration filters according to the image height or the position in the image are used. In this way, "a plurality of restoration filters" may be used as one set, and a set constituted of a plurality of restoration filters may be set as "a common filter for use in common with regard to the zoom magnification of the optical zoom".

<Adjustment of Restoration Gain>

Next, an adjustment example of the amplification factor (restoration gain) of this example will be described.

Figure 7:
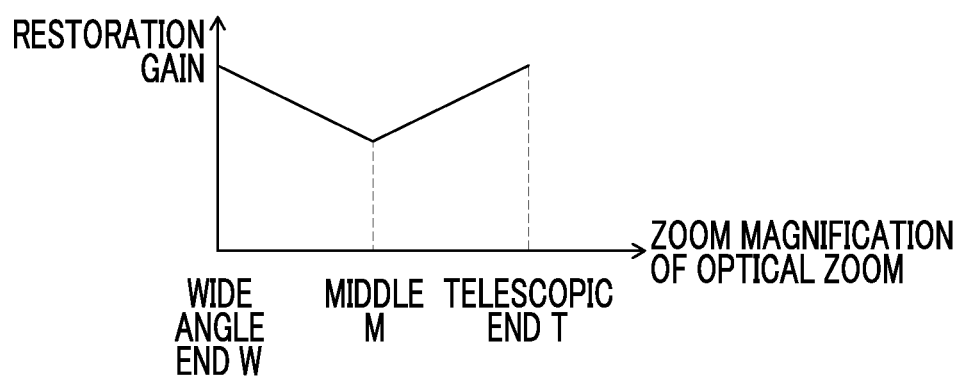
FIG. 7 shows an example of the relationship of "zoom magnification of an optical zoom-restoration gain", and shows a relationship example designed primarily from the viewpoint of improving resolution characteristics of a lens.

FIG. 7 shows an example of the relationship of "zoom magnification of an optical zoom-restoration gain", and primarily shows a relationship example from the viewpoint of improving the resolution characteristics of the lens. The horizontal axis of FIG. 7 is based on "the zoom magnification (zoom position) of the optical zoom", and the vertical is based on the "restoration gain" of image data.

In regard to the resolution characteristics of the lens and optical zoom magnification, as shown in FIG. 6, the resolution of the optical system (lens 16) is degraded approach toward the zoom end ("wide angle end W", "telescopic end T"), the response in the zoom end portion tends to be reduced compared to zoom magnification ("middle M") in the middle. For this reason, as shown in FIG. 7, it is preferable to compensate for "resolution deterioration of the optical system accompanied by the fluctuation of zoom magnification", which cannot be recovered through the filtering process using the common restoration filter, by adjusting the amplification factor (restoration gain). Accordingly, it is preferable to increase the restoration gain in the zoom end portion where resolution deterioration of the optical system is conspicuous, and to make the response of image data after the restoration process closer to "1" over the entire spatial frequency. In this way, from the viewpoint of improving the resolution characteristics of the lens, as shown in FIG. 7, it is preferable to change the restoration gain based on the zoom magnification of the optical zoom, to increase the restoration gain in the zoom end portion compared to the zoom magnification in the middle, and to gradually increase the restoration gain toward the zoom end.

Since the superiority or inferiority of image quality depends on the visual characteristics of the user, it is preferable that the point image restoration process (restoration gain adjustment) is also performed based on the visual characteristics of the user. In general, human visual sense has a characteristic to be sensitive to a low frequency component and insensitive to a high frequency component. If an image component in a high frequency region is enhanced by the restoration process, a noise component which exists in the high frequency region is enhanced or ringing or the like due to a saturated pixel or the like is likely conspicuous; thus, an image of a rough impression as a whole is restored.

When optical zoom magnification is on the wide angle side, the image angle increases and wide photographing is performed; thus, the number of high-frequency objects tends to increase. Accordingly, when optical zoom magnification is on the wide angle side, the main object is photographed small and is often photographed such that surrounding circumstances are easily understood, and in order to increase resolution of the object, resolution performance of the high frequency component tends to be more important. When optical zoom magnification is on the telescopic side, the image angle decreases and zoom-in photographing is performed; thus, the number of high-frequency objects tends to decrease. Accordingly, when the optical zoom magnification is on the telescopic side, the main object is photographed great, in many cases, resolution is less important in an object image other than the main object, and in order to increase resolution of the object, resolution performance of the low frequency component tends to be more important and resolution performance of the high frequency component tends to be less important.

Figure 8:
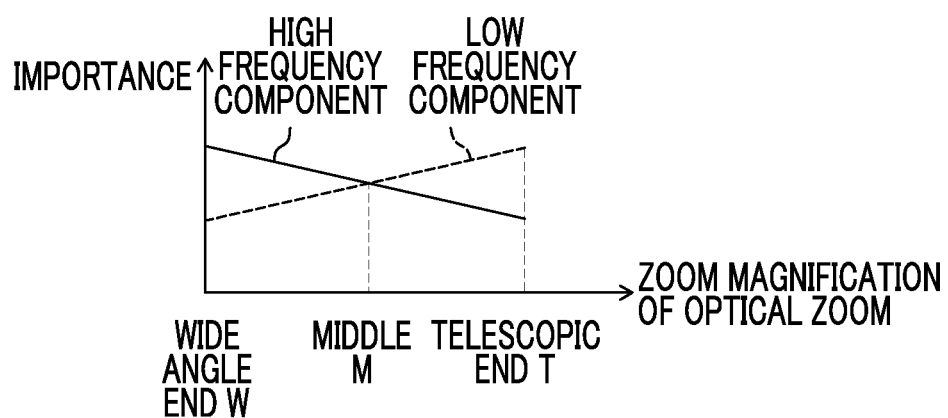
FIG. 8 shows an example of the relationship of "zoom magnification of an optical zoom-importance", and in particular, shows "importance of low frequency component and high frequency component at the time of image restoration" in consideration of visual characteristics of a user.

FIG. 8 shows an example of the relationship of "zoom magnification of an optical zoom-importance", and in particular, shows "importance of a low frequency component and a high frequency component at the time of image restoration" in consideration of the visual characteristics of the user. The horizontal axis of FIG. 8 is based on "zoom magnification (zoom position) of an optical zoom", and the vertical axis is based on "importance at the time of image restoration", and indicates that importance is high on the upper side toward the paper surface and importance is low on the lower side. As described above, in regard to a low frequency component, when optical zoom magnification is on the wide angle side, importance is not high, but importance gradually increases toward the telescopic side (see a dotted-line portion of FIG. 8). In regard to the high frequency component, when the zoom magnification of the optical zoom is on the wide angle side, importance is high, but importance gradually decreases toward the telescopic side (see a solid-line portion of FIG. 8).

Figure 9:
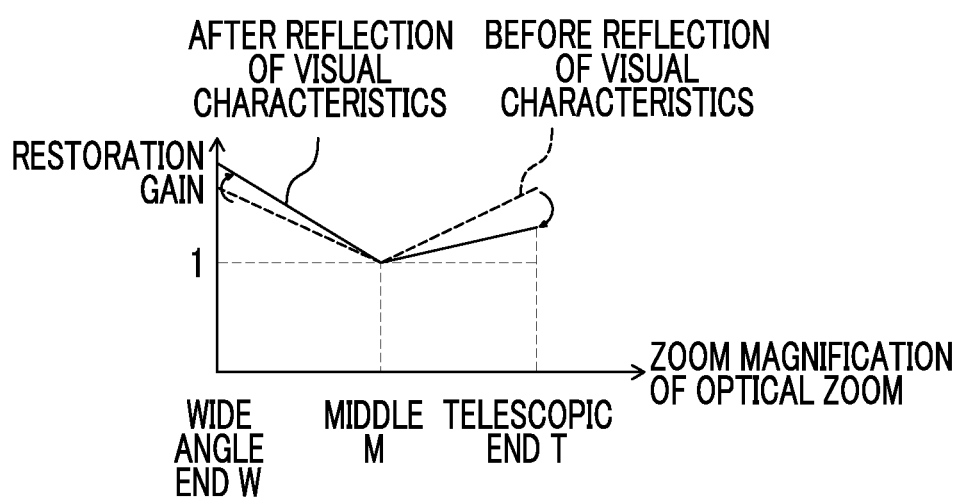
FIG. 9 shows an example of the relationship of "zoom magnification of an optical zoom-restoration gain", and in particular, shows a relationship example designed in consideration of "resolution characteristics of an optical system (see FIG. 7)" and "visual characteristics (see FIG. 8)".

FIG. 9 shows an example of the relationship of "zoom magnification of an optical zoom-restoration gain", and in particular, shows a relationship example designed in consideration of "the resolution characteristics of the optical system (see FIG. 7)" and the "visual characteristics (see FIG. 8)". The horizontal axis of FIG. 9 is based on "the zoom magnification (zoom position) of the optical zoom", and the vertical axis is based on the "restoration gain (amplification factor)" of image data. A graphic curve indicated by a dotted line of FIG. 9 shows a relationship example of "zoom magnification of an optical zoom-restoration gain" in consideration of "the resolution characteristics of the optical system", and a graphic curve indicated by a solid line shows a relationship example of "zoom magnification of an optical zoom-restoration gain" in consideration of the "visual characteristics".

The point image restoration process of this example is a process for primarily improving MTF deterioration in an intermediate frequency region to a high frequency region, and the response in the intermediate frequency region to the high frequency region is improved by the adjustment of the restoration gain, the restoration gain on the wide angle side is increased based on the visual characteristics of the user, and the restoration gain on the telescopic side is decreased. That is, when focusing on "the resolution characteristics of the optical system", in order to compensate for resolution deterioration in the zoom end portion, the restoration gain is set such that the restoration gain increases toward the zoom end (see the dotted-line portion of FIG. 9). Furthermore, when the "visual characteristics" are considered, the intermediate frequency component to the high frequency component play an important role in the visual characteristics on the wide angle side; thus, the restoration gain in the point image restoration process is set to be greater (see the solid-line portion of FIG. 9) than when the visual characteristics are not considered (see the dotted-line portion of FIG. 9). Furthermore, since the intermediate frequency component to the high frequency component are less important in the visual characteristics on the telescopic side, the restoration gain in the point image restoration process is set to be smaller than when the visual characteristics are not considered, and it is possible to effectively avoid an adverse effect (increase in noise, occurrence of ringing, or the like) which is assumed by restoration of the intermediate frequency component to the high frequency component.

In this way, the restoration gain is adjusted in consideration of the visual characteristics based on optical zoom magnification, whereby it is possible to generate a restored image (recovered image data) having excellent image quality in visual sense while compensating for "resolution deterioration of the optical system accompanied by the fluctuation of zoom magnification" which cannot be recovered through the filtering process using the common restoration filter.

<Hysteresis Control of Restoration Gain>

In the example shown in FIG. 9, although the restoration gain is determined in consideration of "the visual characteristics in consideration of optical zoom magnification and the spatial frequency tendency", the restoration gain may be determined in consideration of other visual characteristics. For example, when the common restoration filter with regard to the zoom magnification of the optical zoom is used, overcorrection due to the point image restoration process is likely to occur in zoom magnification on the telescopic side rather than the wide angle side, and in particular, overcorrection is likely to occur in a peripheral portion (high image height position) of an image. Accordingly, when optical zoom magnification changes continuously during photographing of a moving image, in particular, when optical zoom magnification is continuously switched from the wide angle side to the telescopic side (when the zoom direction is "from the wide angle side to the telescopic side"), image quality continuity between the frames of the moving image may not be sufficiently maintained due to the point image restoration process.

Accordingly, the gain adjustment unit 42 may determine the restoration gain (amplification factor) based on the zoom direction for acquiring source image data. That is, the restoration gain to the zoom magnification of the optical zoom may be changed between when the zoom direction at the time of photographing and acquiring source image data (moving image) to be subjected to the point image restoration process is "from the wide angle side to the telescopic side" and when the zoom direction is "from the telescopic side to the wide angle side". For example, in a part or the whole of the range (the range of "middle M" to "telescopic end T") in which optical zoom magnification is on the telescopic side, the restoration gain when the zoom direction is "from the wide angle side to the telescopic side" may be smaller than when the zoom direction is "from the telescopic side to the wide angle side". The restoration gain when the zoom direction is "from the wide angle side to the telescopic side" is smaller than when the zoom direction is "from the telescopic side to the wide angle side", whereby it is possible to make the influence of overcorrection or the like due to point image restoration process visually inconspicuous.

<Point Image Restoration Process Flow>

Next, the flow of the point image restoration process will be described.

First Embodiment

Figure 10:
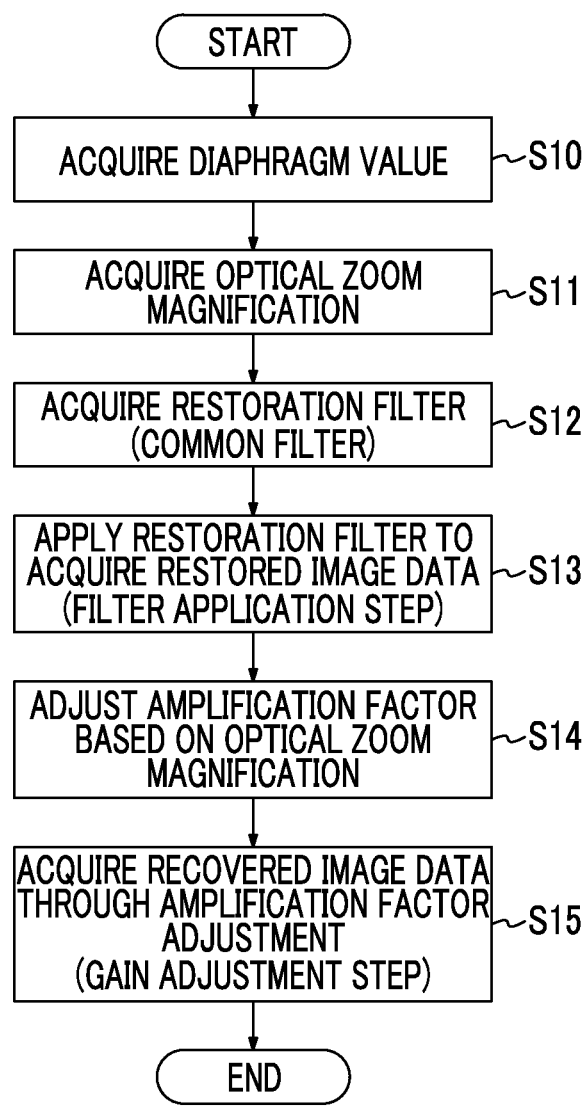
FIG. 10 is a flowchart of a point image restoration process according to a first embodiment.

FIG. 10 is a flowchart of a point image restoration process according to a first embodiment. A restoration filter for use in the point image restoration process of this embodiment is changed based on a diaphragm value, but is common with regard to the zoom magnification of the optical zoom. A point image restoration processing flow shown in FIG. 10 can be applied to all images regardless of a moving image and a still image, and when the point image restoration processing flow is applied to a moving image, the process is performed for each image (frame) constituting the moving image.

First, photographing condition data is acquired by the point image restoration control processing unit 39. Specifically, a diaphragm value for acquiring source image data to be processed is acquired (S10 of FIG. 10), and the zoom magnification of the optical zoom is acquired (S11). An acquisition method of photographing condition data is not particularly limited, and for example, when photographing condition data is attached to source image data (Exif or the like), photographing condition data is acquired along with source image data. When photographing condition data is not attached to source image data, photographing condition data may be acquired from the device control unit 34 (the zoom control unit 37 or the like) which controls the diaphragm 17 or the zoom lens (not shown).

Then, a restoration filter for use in the point image restoration process is acquired by the filter application unit 41 (S12). In this example, a restoration filter is selected based on the "diaphragm value" at the time of photographing and acquiring source image data, and "a common restoration filter (common filter) with regard to optical zoom magnification" according to the "diaphragm value" is read and acquired from among a plurality of restoration filter candidates stored in the memory 43. Then, in the filter application unit 41, the acquired restoration filter is applied to source image data, and restored image data is acquired (S13: filter application step; see the "filter application process $P_f$" of FIG. 4).

Then, the adjustment of the amplification factor (restoration gain) of the difference between source image data and restored image data is performed by the gain adjustment unit 42 based on the zoom magnification of the optical zoom of the optical system (S14; see the "gain adjustment process $P_g$" of FIG. 4). Then, in the gain adjustment unit 42, recovered image data is acquired from "the difference between source image data and restored image data" after restoration gain adjustment and "source image data" (S15: gain adjustment step; see the "addition process $P_a$" of FIG. 4).

As described above, according to this embodiment, it is possible to reduce the amount of data of the restoration filter using the common restoration filter with regard to optical zoom magnification, and it is possible to obtain recovered image data with high restoration accuracy by adjusting the restoration gain of the point image restoration process based on optical zoom magnification.

Second Embodiment

In this embodiment, a determination method of a restoration filter and a restoration gain is switched according to whether or not the diaphragm value for acquiring source image data is a "small diaphragm". That is, when the diaphragm value of the optical system (the diaphragm 17) for acquiring source image data is a value on a small diaphragm side than a threshold value (first diaphragm value), the filter application unit 41 acquires restored image data using the common filter with regard to the zoom magnification of the optical zoom of the optical system as the restoration filter, and the gain adjustment unit 42 determines the restoration gain (amplification factor) based on the zoom magnification of the optical zoom of the optical system.

Figure 11:
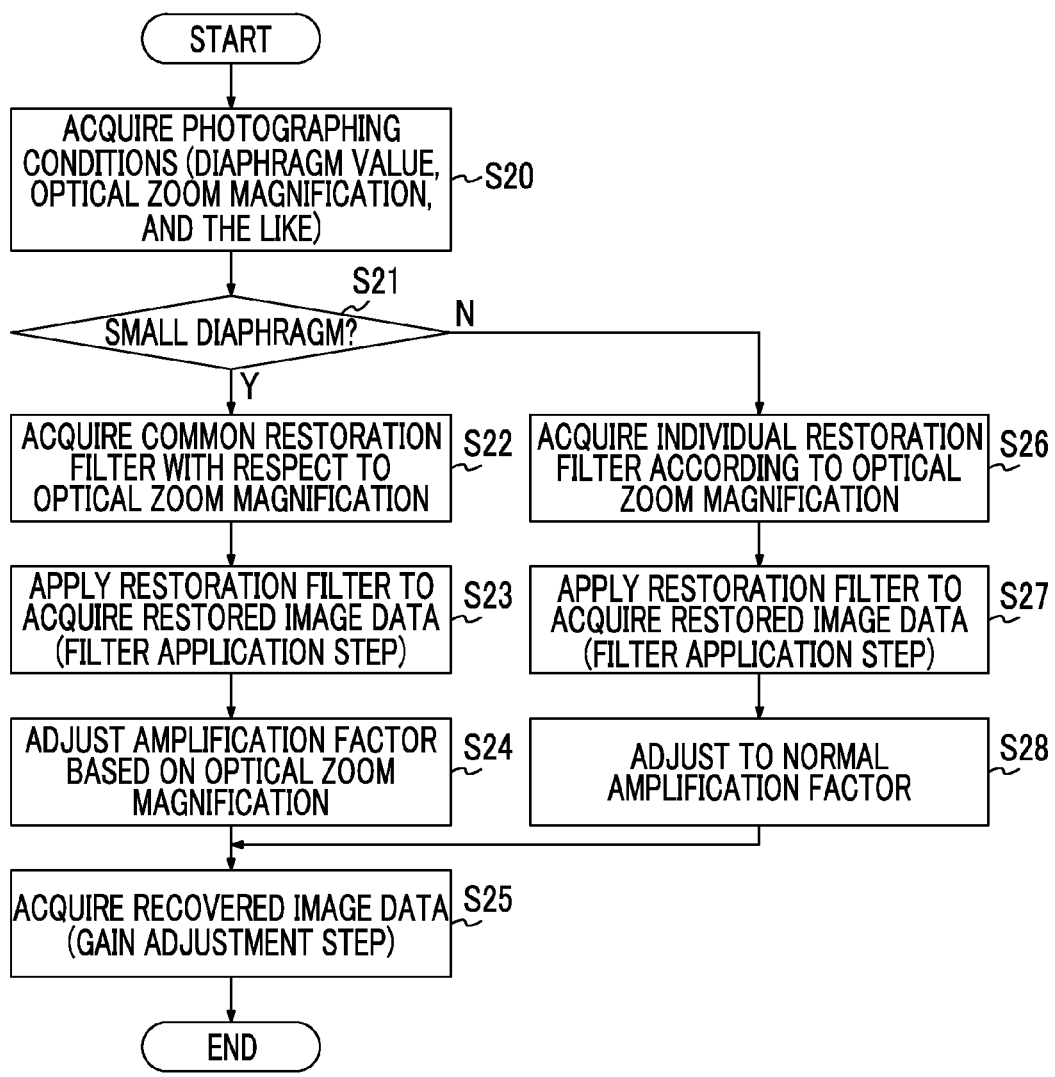
FIG. 11 is a flowchart of a point image restoration process according to a second embodiment.

FIG. 11 is a flowchart of a point image restoration process according to a second embodiment. In this embodiment, detailed description of the same processes as in the first embodiment (see FIG. 10) will not be repeated.

First, the point image restoration control processing unit 39 acquires photographing condition data (a diaphragm value, zoom magnification of an optical zoom, and the like) (S20 of FIG. 11), and determines whether or not the diaphragm value is a value on a small diaphragm side (S21). Specifically, it is determined whether or not the diaphragm value is a value on the small diaphragm side according to whether or not the diaphragm value is equal to or greater than a threshold value. For example, when an F value is used as the diaphragm value, it is possible to determine whether or not the diaphragm value is a value on the small diaphragm side according to whether or not the F value at the time of photographing source image data is equal to or greater than "an F value for small diaphragm determination" determined in advance. The determination regarding "whether or not the diaphragm value is a value on the small diaphragm side" may be performed by the filter application unit 41, or may be performed by other processing units of the point image restoration control processing unit 39.

When it is determined that the diaphragm value is a value on the small diaphragm side (Y in S21), in the filter application unit 41, the common restoration filter (common filter) with regard to optical zoom magnification is acquired (S22), and the common restoration filter is applied to source image data such that restored image data is acquired (S23). Furthermore, the adjustment of the restoration gain is performed by the gain adjustment unit 42 based on the zoom magnification of the optical zoom of the optical system (S24), and recovered image data is acquired from "the difference between source image data and restored image data" after restoration gain adjustment and "source image data" (S25).

When it is determined that the diaphragm value is not a value on the small diaphragm side (N in S21), in the filter application unit 41, the individual restoration filter (individual filter) according to the zoom magnification of the optical zoom is acquired (S26), and the individual restoration filter is applied to source image data such that restored image data is acquired (S27). Furthermore, gain adjustment to a normal restoration gain is performed by the gain adjustment unit 42 without depending on optical zoom magnification (S28), and recovered image data is acquired from "the difference between source image data and restored image data" after restoration gain adjustment and "source image data" (S25).

On the small diaphragm side, since the influence of optical zoom magnification on the point spread function of the optical system is comparatively small, even if the point image restoration process (filter application process) using the common restoration filter with regard to optical zoom magnification is performed, unconformity (overcorrection, ringing, or the like) in image quality is hardly conspicuous. When the diaphragm value is not a value on the small diaphragm side, since the influence of optical zoom magnification on the point spread function of the optical system is comparatively great, the point image restoration process (filter application process) using the individual restoration filter reflecting optical zoom magnification is performed, whereby it is possible to perform image restoration with excellent accuracy. Accordingly, according to this embodiment described above, since a selection method of a restoration filter and a restoration gain for use in the point image restoration process is switched based on whether or not the diaphragm 17 at the time of photographing and acquiring source image data is a small diaphragm, it is possible to perform the point image restoration process while achieving both reduction in the amount of data of the restoration filter and high-accuracy image quality restoration at a high level.

Third Embodiment

In a point image restoration process for a "still image", it is important to primarily improve image quality of a single image (still image); however, in a point image restoration process for a "moving image", it is necessary not only to improve image quality of each frame, but also to maintain continuity in image quality between the preceding and succeeding frames and to simplify the process itself to perform the process at a high speed. In particular, when optical zoom magnification changes continuously during photographing of a moving image, the point spread function also changes with the fluctuation of optical zoom magnification. For this reason, even if optical zoom magnification changes during photographing of a moving image, it is preferable to perform a point image restoration process capable of supplying a smooth moving image without obstructing continuity between the frames.

In this embodiment, it is determined whether source image data to be processed is either a "moving image" or a "still image", and a determination method of a restoration filter and a restoration gain is switched based on the determination result. That is, when source image data is a moving image, the filter application unit 41 acquires restored image data using the common filter with regard to the zoom magnification of the optical zoom of the optical system as the restoration filter, and the gain adjustment unit 42 determines the restoration gain (amplification factor) based on the zoom magnification of the optical zoom of the optical system. When the source image data is a still image, the filter application unit 41 acquires restored image data using the individual restoration filter determined based on the zoom magnification of the optical zoom of the optical system, instead of the common restoration filter.

A "moving image" includes a series of a plurality of time-series images which are constituted of an image group (frame group) continuous over time and are photographed and acquired in a comparative short period of time. Accordingly, a moving image in which a plurality of images (frames) are combined is intended to be provided to the user, and for example, a recorded image recorded in the memory or the like or a live view image displayed on the display unit at the time of photographing is included in the concept of a "moving image". A "still image" is an image which is basically constituted of a single image and is provided to the user as a single image.

Figure 12:
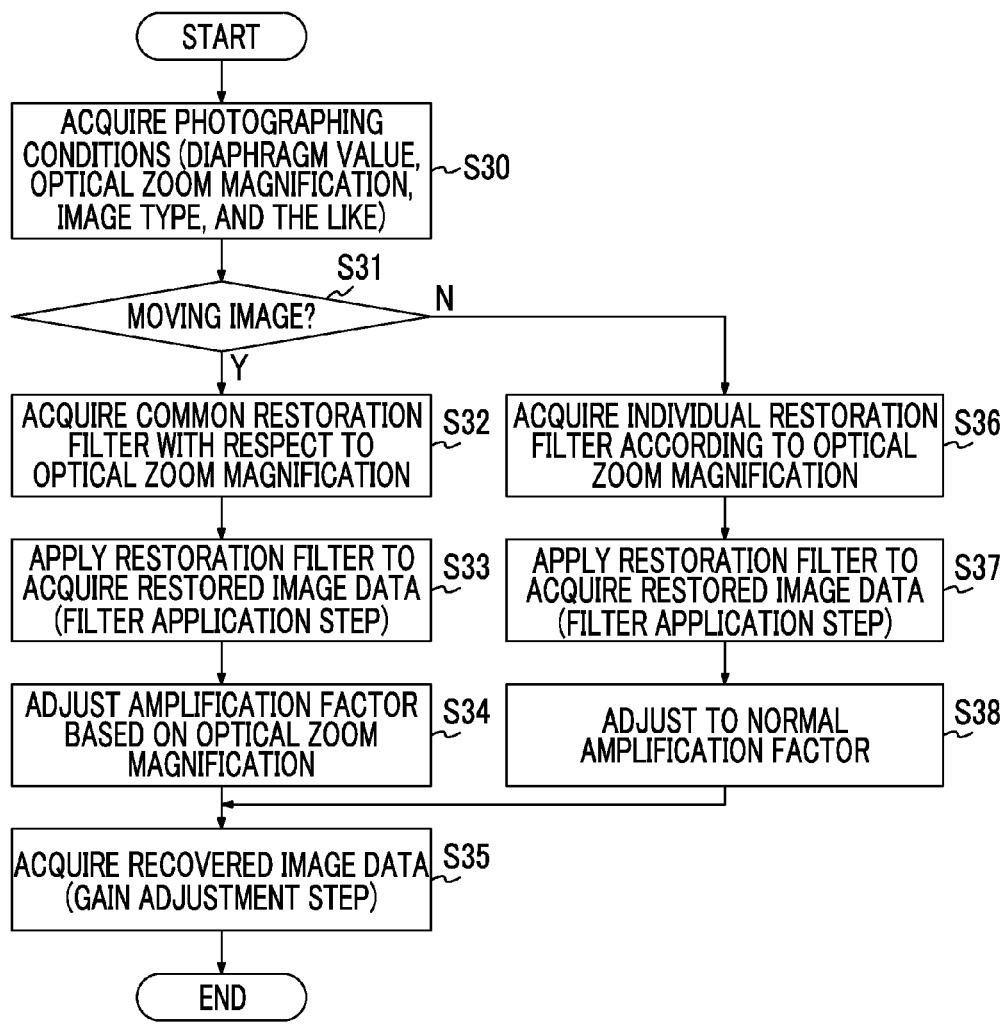
FIG. 12 is a flowchart of a point image restoration process according to a third embodiment.

FIG. 12 is a flowchart of a point image restoration process according to a third embodiment. In this embodiment, detailed description of the same processes as in the first embodiment (see FIG. 10) will not be repeated.

First, the point image restoration control processing unit 39 acquires photographing condition data (a diaphragm value, zoom magnification of an optical zoom, an image type, and the like) (S30 of FIG. 12), and determines whether or not source image data to be processed is a moving image (S31). A determination method regarding whether or not source image data is a moving image is not particularly limited, and it is possible to determine whether or not source image data is a moving image directly or indirectly with reference to information relating to a photographing mode at the time of photographing source image data or information (for example, a file extension and the like) attached to source image data. The determination regarding "whether or not source image data is a moving image" may be performed by the filter application unit 41, or may be performed by other processing units of the point image restoration control processing unit 39.

When it is determined that source image data is a moving image (Y in S31), in the filter application unit 41, a common restoration filter with regard to optical zoom magnification is acquired (S32), and the common restoration filter is applied to source image data (moving image) such that restored image data is acquired (S33). Furthermore, the adjustment of the restoration gain is performed by the gain adjustment unit 42 based on optical zoom magnification (S34), and recovered image data is acquired from "the difference between source image data and restored image data" after restoration gain adjustment and "source image data" (S35).

When it is determined that source image data is not a moving image (N in S31), in the filter application unit 41, the individual restoration filter according to optical zoom magnification is acquired (S36), and the individual restoration filter is applied to source image data (still image) such that restored image data is acquired (S37). Furthermore, gain adjustment to a normal restoration gain is performed by the gain adjustment unit 42 without depending on optical zoom magnification (S38), and recovered image data is acquired from "the difference between source image data and restored image data" after restoration gain adjustment and "source image data" (S35).

In the "still image", image quality of the single image is important; however, in the "moving image", not only image quality of each frame but also continuity between the frames or a high-speed, stable, and simple process is important. According to this embodiment, it is possible to perform the point image restoration process with excellent image quality restoration accuracy for the still image using the individual restoration filter according to optical zoom magnification. Furthermore, it is possible to perform the point image restoration process for the moving image simply and at high-speed using the common restoration filter with regard to the optical zoom magnification, and to favorably maintain continuity between the frames by adjusting the restoration gain based on optical zoom magnification.

Fourth Embodiment

The second embodiment and the third embodiment may be combined, and the determination method of the restoration filter and the restoration gain may be switched according to "whether or not the diaphragm value for photographing and acquiring source image data is a "small diaphragm" (second embodiment)" and "whether source image data is a "moving image" or a "still image" (third embodiment)".

Figure 13:
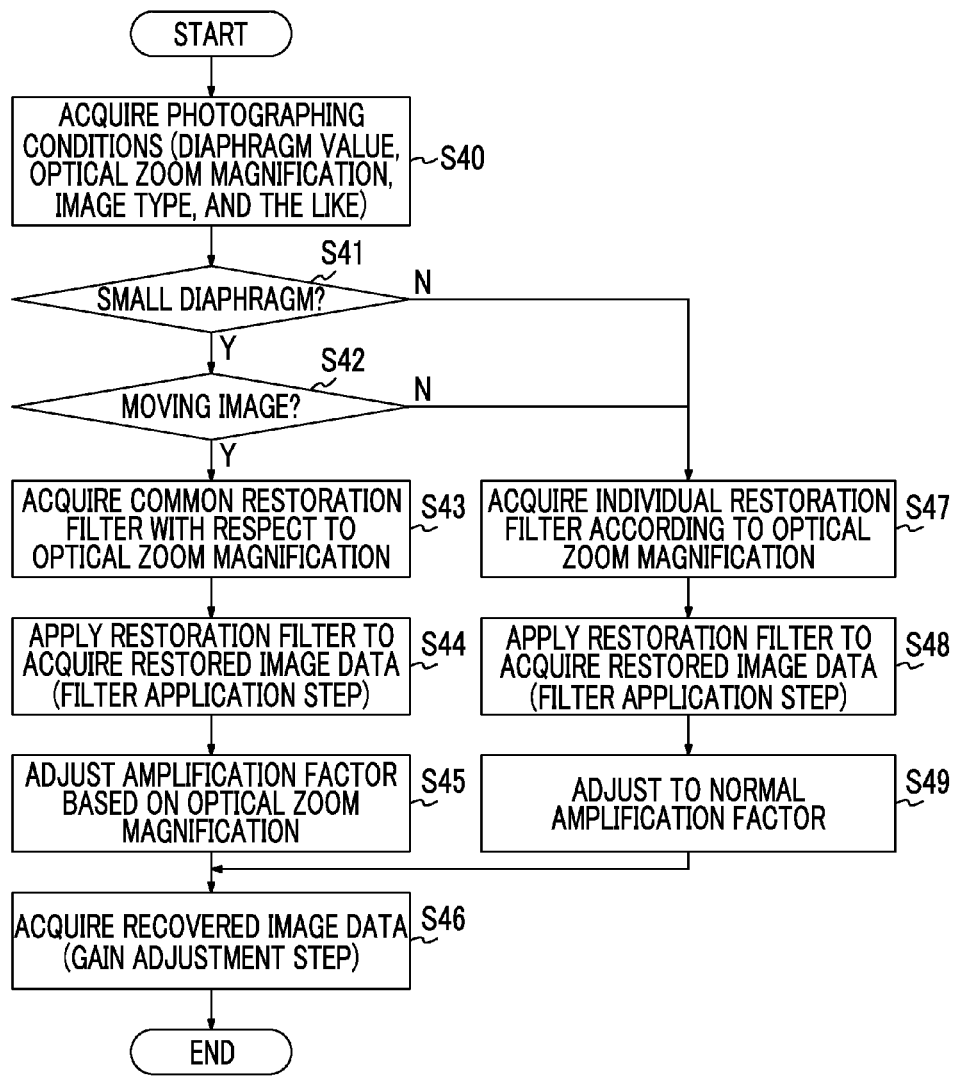
FIG. 13 is a flowchart of a point image restoration process according to a fourth embodiment.

FIG. 13 is a flowchart of a point image restoration process according to a fourth embodiment. In this embodiment, detailed description of the same processes as in the second embodiment (see FIG. 11) and the third embodiment (see FIG. 12) will not be repeated.

First, the point image restoration control processing unit 39 acquires photographing condition data (a diaphragm value, zoom magnification of an optical zoom, an image type, and the like) (S40 of FIG. 13), and determines whether or not the diaphragm value is a value on the small diaphragm side (S41). When it is determined that the diaphragm value is a value on the small diaphragm side (Y in S41), the point image restoration control processing unit 39 determines whether or not source image data to be processed is a moving image (S42).

When it is determined that source image data is a moving image (Y in S42), in the filter application unit 41, the common restoration filter with regard to optical zoom magnification is acquired (S43), and the common restoration filter is applied to source image data (moving image) such that restored image data is acquired (S44). Furthermore, the adjustment of the restoration gain is performed by the gain adjustment unit 42 based on optical zoom magnification (S45), and recovered image data is acquired from "the difference between source image data and restored image data" after restoration gain adjustment and "source image data" (S46).

When it is determined that the diaphragm value is not a value on the small diaphragm side (N in S41) or when it is determined that source image data is not a moving image (N in S42), in the filter application unit 41, the individual restoration filter according to the zoom magnification of the optical zoom is acquired (S47), and the individual restoration filter is applied to source image data such that restored image data is acquired (S48). Furthermore, gain adjustment to a normal restoration gain is performed by the gain adjustment unit 42 without depending on optical zoom magnification (S49), and recovered image data is acquired from "the difference between source image data and restored image data" after restoration gain adjustment and "source image data" (S46).

Fifth Embodiment

In this embodiment, a determination method of a restoration filter and a restoration gain is switched according to whether or not source image data to be processed is "a still image photographed during photographing of a moving image (moving image photographing mode)". That is, when source image data is a moving image, the filter application unit 41 acquires restored image data using the common filter with regard to the zoom magnification of the optical zoom as the restoration filter. When source image data is acquired by still image photographing during photographing of a moving image, the filter application unit 41 acquires restored image data using the individual restoration filter determined based on the zoom magnification of the optical zoom of the optical system, instead of the individual filter.

Figure 14:
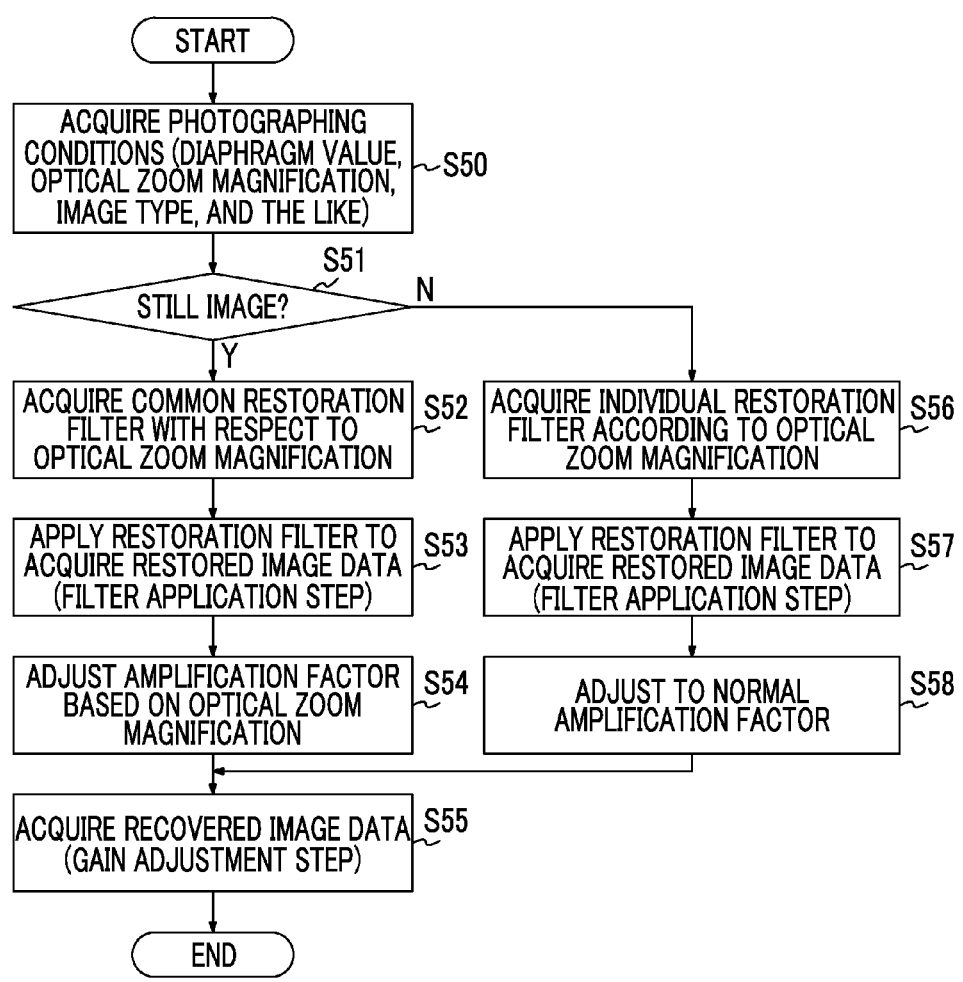
FIG. 14 is a flowchart of a point image restoration process according to a fifth embodiment.

FIG. 14 is a flowchart of a point image restoration process according to a fifth embodiment. In this embodiment, detailed description of the same processes as in the third embodiment (see FIG. 12) will not be repeated. FIG. 14 shows a processing flow of a case where the moving image photographing mode is selected and a sill image can be photographed separately at the time of photographing a moving image. A method of selecting the photographing mode or of photographing a still image during photographing of a moving image is not particularly limited, and for example, "the selection of the photographing mode" or "still image photographing during photographing of a moving image" may be performed through the user interface 29 (including buttons, shutters, and the like) in the digital camera 10.

First, the point image restoration control processing unit 39 acquires photographing condition data (a diaphragm value, zoom magnification of an optical zoom, an image type, and the like) (S50 of FIG. 14), and determines whether or not source image data to be processed is a still image (S51). A determination method regarding whether or not source image data is a still image is not particularly limited, and it is possible to determine whether or not source image data is a moving image directly or indirectly with reference to information relating to the photographing mode at the time of photographing source image data or information (for example, a file extension and the like) attached to source image data.

When it is determined that source image data is not a still image (N in S51), source image data is handled as a moving image, and the same point image restoration process as in the third embodiment is performed (see S32 to S35 of FIG. 12). That is, in the filter application unit 41, the common restoration filter with regard to optical zoom magnification is acquired (S52), and the common restoration filter is applied to source image data (moving image) such that restored image data is acquired (S53). Furthermore, the adjustment of the restoration gain is performed by the gain adjustment unit 42 based on optical zoom magnification (S54), and recovered image data is acquired from "the difference between source image data and restored image data" after restoration gain adjustment and "source image data" (S55).

When it is determined that source image data is a still image (Y in S51), in the filter application unit 41, the individual restoration filter according to optical zoom magnification is acquired (S56), and the individual restoration filter is applied to source image data (still image) such that restored image data is acquired (S57). Furthermore, gain adjustment to a normal restoration gain is performed by the gain adjustment unit 42 without depending on the optical zoom magnification of the optical system (S58), and recovered image data is acquired from "the difference between source image data and restored image data" after restoration gain adjustment and "source image data" (S55).

According to this embodiment, even if a still image can be photographed during photographing of a moving image, it is possible to perform the point image restoration process with excellent image quality restoration accuracy for the still image using the individual restoration filter according to optical zoom magnification. Furthermore, it is possible to perform the point image restoration process for the moving image simply and at high-speed using the common restoration filter with regard to the optical zoom magnification, and to favorably maintain continuity between the frames by adjusting the restoration gain based on optical zoom magnification.

Also in this embodiment, the determination method of the restoration filter and the amplification factor may be switched according to "whether or not the diaphragm value at the time of photographing source image data is a "small diaphragm" (see the second embodiment)". For example, prior to determining whether or not source image data to be processed is a moving image (see S51 of FIG. 14), it may be determined whether or not diaphragm value at the time of photographing and acquiring source image data is a value on the small diaphragm side. In this case, when it is determined that the diaphragm value is not a value on the small diaphragm side, recovered image data can be acquired through the filter application step using the individual restoration filter according to the zoom magnification of the optical zoom and the gain adjustment step using the normal restoration gain (amplification factor) (see S56 to S58, and S55 of FIG. 14). When it is determined that the diaphragm value is a value on the small diaphragm side, it is possible to perform the point image restoration process through the same process as Steps S51 to S58 of FIG. 14.

In all embodiments described above, when the common filter with regard to optical zoom magnification is used as the restoration filter, the range of optical zoom magnification in which the "common filter" is provided is not particularly limited. Accordingly, the common filter may be used as the restoration filter in the entire range out of a possible fluctuation range (optical zoom magnification range) of optical zoom magnification, or the common filter may be used as the restoration filter in a range of at least specific optical zoom magnification. Furthermore, the common filter may not be used in partial optical zoom magnification out of the optical zoom magnification range, or for example, the common filter may not be used as the restoration filter with magnification "in the vicinity of the telescopic end T", "in the vicinity of the wide angle end W", or "in the vicinity of the middle M of the optical zoom magnification range".

<Switching Process Between Optical Zoom and Digital Zoom>

The digital camera 10 of this example is configured to switch between "a zoom mode using an optical zoom" and "a zoom mode using a digital zoom" with the zoom control unit 37 (see FIG. 2). "The zoom mode using the optical zoom" is a mode in which the zoom lens (not shown) is moved to change the focal distance and to optically change the image angle, thereby performing zoom adjustment. "The zoom mode using the digital zoom" is a mode in which the zoom lens itself is not moved, an image angle range of an image formed on the image capture element 26 is substantially unchanged, a part of an image on the image capture element 26 is enlarged while performing pixel interpolation or while decreasing a thinning rate to change a photographing range, thereby performing zoom adjustment.

Figure 15:
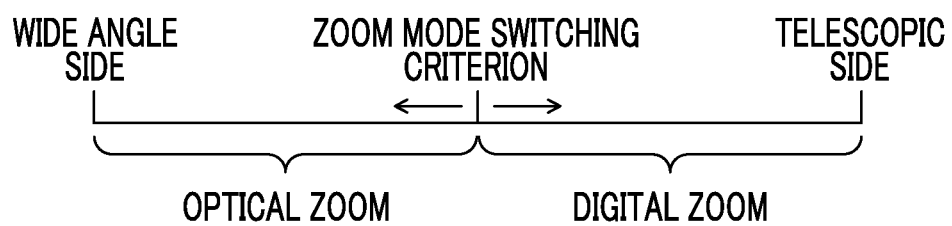
FIG. 15 is a diagram conceptually showing switching between an optical zoom and a digital zoom.

FIG. 15 is a diagram conceptually showing switching between an optical zoom and a digital zoom. Photographing is performed in "the zoom mode using the optical mode" at the time of photographing on a wide angle side on which wide-range photographing can be performed, and if "a zoom mode switching criterion" is reached, the zoom magnification of the optical zoom is switched to "the zoom mode using the digital zoom". Then, photographing is performed in "the zoom mode using the digital zoom" at the time of photographing on the telescopic side farther than "the zoom mode switching criterion".

For switching the zoom mode from the optical zoom to the digital zoom, it is required that a great difference in image quality of an image between both zoom modes is inconspicuous. In particular, when the point image restoration process is performed, it is preferable to make image quality deterioration (ringing, overcorrection, or the like) due to the point image restoration process inconspicuous, and it is required that continuity of image quality between the frames is favorably maintained before and after switching the zoom mode at the time of photographing of a moving image.

Accordingly, in this example, the zoom magnification of the optical zoom to be a criterion for switching between the optical zoom and the digital zoom is determined based on the point spread function of the optical system. In general, in a point image restoration process for an image photographed with optical zoom magnification on the wide angle side, image quality deterioration (ringing, overcorrection, or the like) is comparatively inconspicuous, and in a point image restoration process for an image photographed with optical zoom magnification on the telescopic side, image quality deterioration is comparatively conspicuous. In particular, when "the common restoration filter with regard to optical zoom magnification is used", such a tendency appears, and in the image photographed with optical zoom magnification on the telescopic side farther than the image photographed with optical zoom magnification on the wide angle side, unconformity, such as overcorrection, is likely conspicuous due to the point image restoration process.

Accordingly, the zoom magnification of the optical zoom with which image quality deterioration due to point image restoration process is conspicuous may be set as the "zoom mode switching criterion", photographing may be performed in "the zoom mode using the optical zoom" in a range where image quality deterioration due to point image restoration process is inconspicuous, and photographing may be performed in "the zoom mode using the digital zoom" on the telescopic side farther than the "zoom mode switching criterion".

The "zoom mode switching criterion" may be determined in advance for each type of optical system (the lens 16, the diaphragm 17, or the like) by an experiment or the like, or may be calculated from the point spread function of the optical system at the time of mounting the lens unit 12 on the camera body 14, or the like. For example, the zoom mode switching criterion may be determined in advance for each type of optical system, and the zoom control unit 37 may switch between "the zoom mode using the optical zoom" and "the zoom mode using the digital zoom" based on the zoom mode switching criterion determined in advance. The zoom mode switching criterion determined in advance for each type of optical system may be stored in the memory in the digital camera 10 (the lens unit 12, the camera body 14), or may be stored in an external device (the computer 60, the server 80, or the like). The zoom control unit 37 may read the zoom mode switching criterion corresponding to the lens unit 12 (optical system) mounted on the camera body 14 from the memory. Furthermore, the zoom control unit 37 may acquire the point spread function of the lens unit 12 (optical system) mounted on the camera body 14 and may calculate the zoom mode switching criterion from the point spread function. The point spread function of the lens unit 12 may be stored in the memory in the digital camera 10 (the lens unit 12, the camera body 14) or an external device (the computer 60, the server 80, or the like), and the zoom control unit 37 may read the corresponding point spread function from the memory.

The "zoom mode switching criterion" may be determined based on the zoom direction for acquiring source image data. That is, the zoom magnification (zoom mode switching criterion) of the optical zoom to be the criterion for switching between the optical zoom and the digital zoom may be changed between when the zoom direction is "from the wide angle side to the telescopic side" and when the zoom direction is "from the telescopic side to the wide angle side". As described above, in the point image restoration process for the image photographed with zoom magnification on the telescopic side rather than the wide angle side, overcorrection or the like is likely to occur, and in particular, when the zoom direction is "from the wide angle side to the telescopic side", it is preferable to prevent the collapse of continuity of image quality in a visual sense. Accordingly, when the zoom direction is "from the wide angle side to the telescopic side", the zoom mode switching criterion may be set to "zoom magnification on the wide angle side" compared to when the zoom direction is "from the telescopic side to the wide angle side".

<Modification Examples>

Next, an example where a restoration filter is selected based on a difference of a point spread function according to an image height of an optical system and an example where switching between an optical zoom and a digital zoom based on a difference of a point spread function according to an image height of an optical system is performed will be described. The same configurations as those in the foregoing embodiments are represented by the same reference numerals, and detailed description thereof will not be repeated.

The filter application unit 41 of this example selects a filter for use as a restoration filter from among candidates (a plurality of filter candidates) of "the common restoration filter with regard to the magnification of the optical zoom of the optical system" based on the difference between a modulation transfer function (MTF) of an image height central portion and an MTF of an image height peripheral portion out of the optical system (the lens 16 or the like). That is, a plurality of filter candidates of the restoration filter includes a "first filter candidate" and a "second filter candidate" different from the first filter candidate, and when the difference between the MTF of the image height central portion and the MTF of the image height peripheral portion is smaller than a threshold value (first threshold value), the filter application unit 41 uses the first filter candidate as the restoration filter, and when the difference between the MTF of the image height central portion and the MTF of the image height peripheral portion is equal to or greater than the threshold value, the filter application unit 41 uses the second filter candidate as the restoration filter. The "image height central portion" used herein means a place on the optical axis or in the vicinity of the optical axis out of the optical system, and the "image height peripheral portion" means a place having an image height greater than the image height central portion out of the optical system. For example, when the optical axis center (optical axis position) is referred to as an image height "0", and the radius of an image circle projected on the image capture element (see reference symbol "26" of FIG. 1) is referred to as "1" (when the optical axis center is aligned with the center of the image capture element, and the center of the image capture surface of the image capture element is referred to as "0", and the apex of the image capture surface of the image capture element is referred to as "1"), a region in a concentric circle in a range represented by "0 to 0.1" may be set as the "image height central portion", and a region in a range represented by "0.8±0.1" may be set as the "image height peripheral portion". These numerical values defining the "image height central portion" and the "image height peripheral portion" are just an example, and can be appropriately changed.

In the following example, for convenience of description, a simple method which selects an optimum restoration filter from a candidate group of the restoration filter with reference to MTFs in a sagittal direction (Sag direction) and a tangential direction (Tan direction) is used. Although there are various selection methods of the restoration filter according to the determination criterion, in the following example, the response ratio at a specific frequency in the image height central portion and the image height peripheral portion of the optical system is focused. In the method using the MTFs in the sagittal direction and the tengential direction as information indicating the point spread function, phase component (PTF) information or MTF information relating to directions other than the sagittal direction and the tangential direction is not considered compared to a case where the PSF is used; however, since it is advantageous in that the amount of data can be made very compact, this method is beneficial in the lens interchangeable digital camera 10 (image capture device) or the like.

Figure 16:
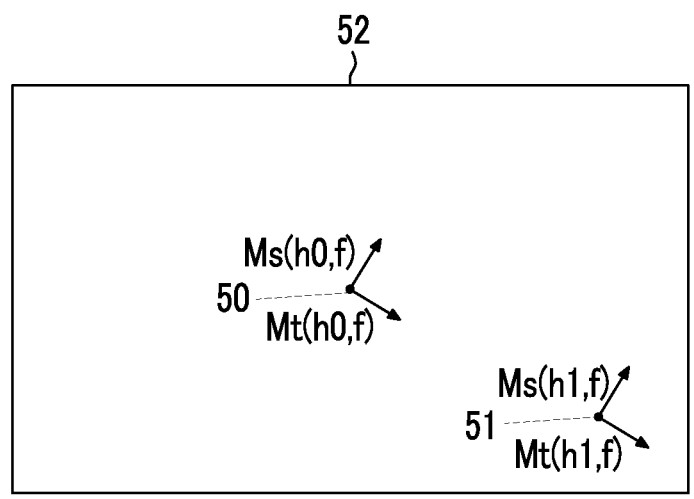
FIG. 16 is a conceptual diagram showing an image height central portion and an image height peripheral portion in an optical system.

FIG. 16 is a conceptual diagram showing an image height central portion 50 and an image height peripheral portion 51 in an optical system 52. For convenience of description, in the optical system 52 of FIG. 16, a rectangular shape corresponding to a photographic image (an effective pixel range of the image capture element 26) is shown, the image height central portion 50 is set on the optical axis, and the image height peripheral portion 51 is set in a corner portion (in FIG. 16, a lower right corner portion) of the optical system 52.

The filter application unit 41 of this example selects a restoration filter (a set of restoration filters), in which the ratio of a restoration filter corresponding to the image height central portion 50 and a restoration filter corresponding to the image height peripheral portion 51 is closest to the ratio of an MTF of the image height central portion 50 and an MTF of the image height peripheral portion 51 (central MTF and peripheral MTF), from among a plurality of filter candidates. With this, a restoration filter where "the magnitude of image blur in the image height peripheral portion 51" matches most "a restoration filter applied to the photographic image of the image height peripheral portion 51" can be selected.

The selection process of the restoration filter is represented by Expressions 1 to 3 described below.

That is, the MTF in the sagittal direction at the image height "h (mm)" from the center (optical axis) and the spatial frequency "f (Lp/mm: line pairs/mm)" is referred to as "Ms(h,f)", and the MTF in the tangential direction is referred to as "Mt(h,f)". Furthermore, in regard to an n-th filter candidate at the image height "h (mm)" and the spatial frequency "f (Lp/mm)", the restoration intensity amplification factor in the sagittal direction through the filtering process (filter application process) is referred to as Gs(n,h,f), and the restoration intensity amplification factor in the tangential direction is referred to as Gt(n,h,f). "$h_0$" indicates the image height of the image height central portion 50 (center, optical axis) ("$h_0=0$"), and "$h_1$" indicates the image height of the image height peripheral portion 51 of interest. Accordingly, in the image height central portion 50, the MTF in the sagittal direction is represented by "Ms($h_0$,f)" and the MTF in the tangential direction is represented by "Mt($h_0$,f)", and in the image height peripheral portion 51, the MTF in the sagittal direction is represented by "Ms($h_0$,f)" and the MTF in the tangential direction is represented by "Mt($h_1$,f)". To be exact, since there is no distinction between the sagittal direction and the tangential direction at the center of the optical system 52 (the lens 16), "Ms($h_0$,f)=Mt($h_0$,f)" is established.

In this case, the filter candidate n determined Expressions 1 to 3 described below is selected as the restoration filter for use in the filtering process in the filter application unit 41. Expressions 1 to 3 described below is based on an assumption that a response in a direction in which the degree of blur (resolution deterioration) is great plays a dominant role in a visual sense, without particularly focusing on the difference (anisotropy) between the sagittal direction and the tangential direction.

$$M(h, f) = \min(Ms(h, f), Mt(h, f)) \quad \text{(Expression 1)}$$

$$G(n, h, f) = \max(Gs(n, h, f), Gt(n, h, f)) \quad \text{(Expression 2)}$$

-continued $$n = \underset{n}{\operatorname{argmin}} \left| \frac{M(h_0, f)}{M(h_1, f)} - \frac{G(n, h_1, f)}{G(n, h_0, f)} \right| \quad \text{(Expression 3)}$$

Expression 1 described above indicates that, in each of the image height central portion 50 and the image height peripheral portion 51, the small MTF of the MTF (Ms(h,f)) in the sagittal direction and the MTF (Mt(h,f)) in the tangential direction is set as a representative MTF (M(h,f)). Furthermore, Expression 2 described above indicates that, in each of the image height central portion 50 and the image height peripheral portion 51, in regard to the n-th filter candidate, the great restoration intensity amplification factor of the restoration intensity amplification factor (Gs(n,h,f)) in the sagittal direction and the restoration intensity amplification factor (Gt(n,h,f)) in the tangential direction through the filtering process is set as a representative restoration intensity amplification factor (G(n,h,f)).

The "representative MTF (M(h,f))" and the "representative restoration intensity amplification factor (G(n,h,f))" determined from Expressions 1 and 2 are applied to Expression 3, whereby the number of an optimum filter candidate as a restoration filter is derived. That is, Expression 3 indicates that n (n-th filter candidate) where the absolute value of the difference between "the ratio (M($h_0$,f)/M($h_1$,f)) of the representative MTFs" and "the ratio (G(n,$h_1$,f)/G(n,$h_0$,f)) of the representative restoration intensity amplification factors" in the image height central portion 50 and the image height peripheral portion 51 is minimized is determined.

Accordingly, a filter candidate (first filter candidate) which is selected when "the ratio (M($h_0$,f)/M($h_1$,f)) of the representative MTFs" is comparatively small is different from a filter candidate (second filter candidate) which is selected when "the ratio (M($h_0$,f)/M($h_1$,f)) of the representative MTFs" is comparatively great. In other words, a filter candidate (first filter candidate) which is used when the difference between the representative MTF of the image height central portion 50 and the representative MTF of the image height peripheral portion 51 is smaller than a threshold value (first threshold value) is different from a filter candidate (second filter candidate) which is used when the difference between the representative MTF of the image height central portion 50 and the representative MTF of the image height peripheral portion 51 is equal to or greater than the threshold value (first threshold value).

A specific calculation method of "n (n-th filter candidate)" based on Expressions 1 to 3 described above is not particularly limited, an arbitrary method can be used, and other parameters can also be appropriately set. For example, a spatial frequency f of interest can be determined in total consideration of the optical characteristics, the image restoration characteristics, the visual characteristics, and the like, and "f=0.25 fs (see FIG. 5A)" can be set. Furthermore, a specific position (image height) of the image height peripheral portion 51 can be appropriately determined in total consideration of the optical characteristics, the image restoration characteristics, the visual characteristics, and the like. Expressions 1 to 3 described above use that fact that the restoration intensity (in particular, restoration intensity when an SN ratio is great) of the restoration filter (Wiener filter) becomes the approximate reciprocal of the MTF, and in particular, such a feature becomes evident in the low frequency region.

The filter application unit 41 uses the thus-determined n-th filter candidate as "the common restoration filter with regard to the zoom magnification of the optical zoom of the optical system", thereby performing the point image restoration process (filter application process) in view of the MTF characteristics (point spread function characteristics) based on the image height. The selection of the restoration filter (the calculation of the n-th filter candidate) is performed for each piece of image data accompanied by the point image restoration process. Accordingly, when a filter candidate n1 (restoration filter) used in the point image restoration process of preceding image data (frame) in time series is selected as an optimum filter candidate even in the point image restoration process of succeeding image data (frame) in time series, the filter candidate n1 continues to be used as the restoration filter.

The restoration filter switching method based on the MTF described above is just an example, and the selected filter candidate may be used as the common restoration filter with regard to the entire optical zoom magnification, or the restoration filter may be switched based on the optical zoom magnification. For example, an optimum restoration filter determined in advance by "the determination method of the restoration filter in view of the MTF characteristics based on the image height" described above may be associated with the zoom magnification (zoom position) of the optical zoom, and the zoom magnification (filter switching point) of the optical zoom where the restoration filter is switched may be stored in the memory of the digital camera 10 (for example, the point image restoration control processing unit 39). In this case, the point image restoration control processing unit 39 (filter application unit 41) can switch the restoration filter for use in the point image restoration process based on optical zoom magnification at the time of photographing with reference to the filter switching point stored in the memory.

In the foregoing example, although "switching of the restoration filter" is controlled based on the MTFs of the image height central portion 50 and the image height peripheral portion 51, "switching between the optical zoom and the digital zoom" may be controlled. That is, the zoom magnification (see the "zoom mode switching criterion of FIG. 15") of the optical zoom to be the criterion for switching between the optical zoom and the digital zoom may be determined based on the difference between the MTF of the image height central portion 50 and the MTF of the image height peripheral portion 51.

For example, when the difference between the MTF of the image height central portion 50 and the MTF of the image height peripheral portion 51 is comparatively great, the optical zoom and the digital zoom may be switched with the zoom magnification of the optical zoom on the wide angle side compared to when the difference between the MTF of the image height central portion 50 and the MTF of the image height peripheral portion 51 is comparatively small. When the MTF difference between the image height central portion 50 and the image height peripheral portion 51 is great, overcorrection or the like due to the point image restoration process is likely to occur, in particular, in an image (source image data) photographed and acquired with zoom magnification on the telescopic side. Accordingly, when the difference between the MTF of the image height central portion 50 and the MTF of the image height peripheral portion 51 is comparatively great (when the MTF difference is equal to or greater than a threshold value (second threshold value)), the optical zoom and the digital zoom are switched with optical zoom magnification on the wide angle side compared to when the MTF difference is comparatively small (when the MTF difference is smaller than the threshold value (second threshold value)), whereby it is possible to prevent overcorrection or the like which may be caused by the point image restoration process.

<Other Modification Examples>

The digital camera 10 described above is just for illustration, and the invention can be applied to other configurations. Each functional configuration can be appropriately realized by arbitrary hardware, software, or a combination thereof. For example, the invention can be applied to a program which causes a computer to execute the image processing method (processing step, processing procedure) in each device and processing unit (the camera body controller 28, the device control unit 34, the image processing unit 35, the zoom control unit 37, the point image restoration control processing unit 39, and the like) described above, a computer-readable recording medium (non-transitory recording medium) having the program recorded thereon, or various computers on which the program can be installed.

<Application Example to EDoF System>

Although the restoration process in the embodiments described above is an image process for recovering and correcting point spread (point image blur) according to a specific photographing condition (for example, a diaphragm value, an F value, a focal distance, a lens type, or the like) to restore an original object image, an image restoration process to which the invention can be applied is not limited to the restoration process in the embodiments described above. For example, the restoration process according to the invention can also be applied to a restoration process on image data photographed and acquired by an optical system (a photographing lens or the like) having an extended depth of field (focus) (extended depth of field (EDoF)). Image data of a blurred image photographed and acquired in a state where the depth of field (depth of focus) is extended by the EDoF optical system is subjected to the restoration process, whereby image data of high resolution in a focused state over a wide range can be restored and generated. In this case, the restoration process is performed using a restoration filter based on a point spread function (PSF, OTF, PTF, or the like) of the EDoF optical system and having a filter coefficient set such that satisfactory image restoration can be performed within a range of an extended depth of field (depth of focus).

Hereinafter, an example of a system (EDoF system) relating to restoration of image data photographed and acquired through the EDoF optical system will be described. In an example described below, although an example where a luminance signal (Y data) obtained from image data (RGB data) after a demosaic process is subjected to a restoration process will be described, the timing of the restoration process is not particularly limited, and for example, "image data (mosaic image data) before a demosaic process" or "image data (demosaic image data) after a demosaic process and before a luminance signal conversion process" may be subjected to the restoration process.

Figure 17:
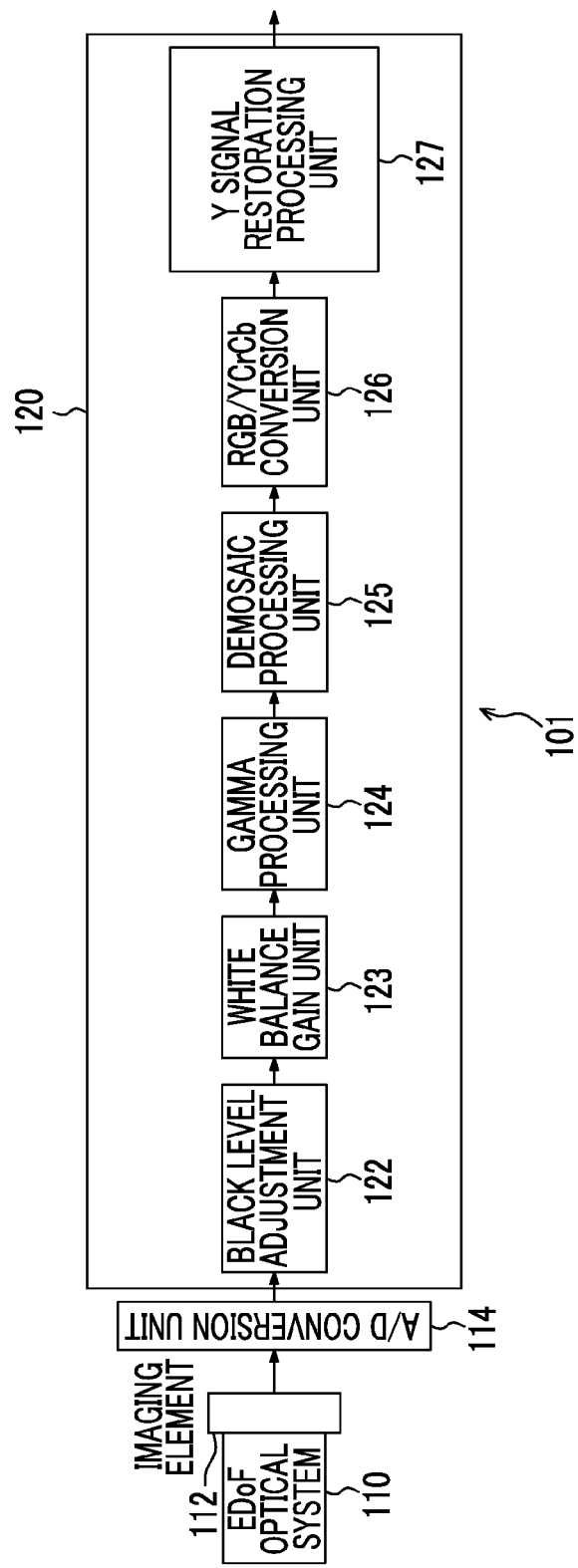
FIG. 17 is a block diagram showing a form of an image capture module including an EDoF optical system.

FIG. 17 is a block diagram showing a form of an image capture module 101 including an EDoF optical system. The image capture module 101 (digital camera or the like) of this example includes an EDoF optical system (lens unit) 110, an image capture element 112, an AD conversion unit 114, and a restoration processing block (the image processing unit) 120.

Figure 18:
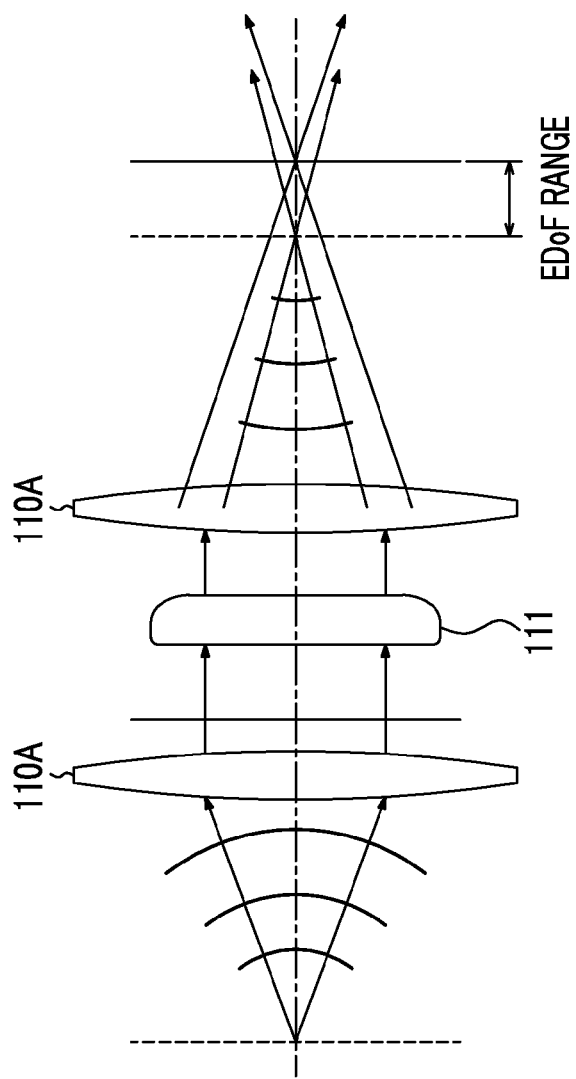
FIG. 18 is a diagram showing an example of the EDoF optical system.

FIG. 18 is a diagram showing an example of an EDoF optical system 110. The EDoF optical system 110 of this example has a single-focus fixed photographing lens 110A, and an optical filter 111 which is arranged at a pupil position. The optical filter 111 modulates a phase, and makes the EDoF optical system 110 (the photographing lens 110A) have an extended depth of field such that an extended depth of field (an extended depth of focus) (EDoF) is obtained. In this way, the photographing lens 110A and the optical filter 111 constitute a lens unit which modulates a phase to extend a depth of field.

The EDoF optical system 110 includes other components based on the needs, and for example, a diaphragm (not shown) is provided near the optical filter 111. The optical filter 111 may be one sheet or may be constituted by combining a plurality of sheets. The optical filter 111 is only an example of optical phase modulation means, and the EDoF of the EDoF optical system 110 (the photographing lens 110A) may be realized by other means. For example, instead of providing the optical filter ill, the EDoF of the EDoF optical system 110 may be realized by the photographing lens 110A designed to have the same function as the optical filter 111 of this example.

That is, the EDoF of the EDoF optical system 110 can be implemented by various means for changing the wavefront of imaging on the light receiving surface of the image capture element 112. For example, "an optical element with a variable thickness", "an optical element with a variable refractive index (a refractive index distribution type wavefront modulation lens or the like)", "an optical element with a variable thickness or refractive index coating on the lens surface or the like (a wavefront modulation hybrid lens, an optical element formed on the lens surface as a phase plane, or the like)", or "a liquid crystal element capable of modulating a phase distribution of light (a liquid crystal spatial phase modulation element or the like)" may be used as EDoF means of the EDoF optical system 110. In this way, the invention can be applied to not only a case where image formation can be performed to be regularly dispersed by an optical wavefront modulation element (the optical filter 111 (phase plate)), but also a case where the same dispersed images as the case of using the optical wavefront modulation element can be formed by the photographing lens 110A itself without using the optical wavefront modulation element.

The EDoF optical system 110 shown in FIGS. 17 and 18 can be reduced in size since a focus adjustment mechanism which performs focus adjustment mechanically can be omitted, and can be suitably mounted in a camera-equipped mobile phone or a mobile information terminal portable.

An optical image after passing through the EDoF optical system 110 having the EDoF is formed on the image capture element 112 shown in FIG. 17 and is converted to an electrical signal here.

The image capture element 112 is constituted of a plurality of pixels arranged in a matrix in a predetermined pattern array (Bayer array, G stripe R/G full checkered pattern, X-Trans array, honeycomb array, or the like), and each pixel includes a microlens, a color filter (in this example, an RGB color filter), and a photodiode. An optical image incident on the light receiving surface of the image capture element 112 through the EDoF optical system 110 is converted to a signal charge in the amount according to the amount of incident light by each photodiode arranged on the light receiving surface. The signal charge of R, G, and B accumulated in each photodiode is sequentially output as a voltage signal (image signal) for each pixel.

The AD conversion unit 114 converts the analog R, G, and B image signals output from the image capture element 112 for each pixel to digital RGB image signals. The digital image signals converted to the digital image signals by the AD conversion unit 114 are applied to the restoration processing block 120.

The restoration processing block 120 includes, for example, a black level adjustment unit 122, a white balance gain unit 123, a gamma processing unit 124, a demosaic processing unit 125, an RGB/YCrCb conversion unit 126, and a Y signal restoration processing unit 127.

The black level adjustment unit 122 subjects the digital image signals output from the AD conversion unit 114 to black level adjustment. For the black level adjustment, a known method may be used. For example, when focusing on a certain effective photoelectric conversion element, the average of signals for dark current amount acquisition corresponding to a plurality of OB photoelectric conversion elements included in a photoelectric conversion element line including the effective photoelectric conversion element is determined, and the black level adjustment is performed by subtracting the average from the signal for dark current amount acquisition corresponding to the effective photoelectric conversion element.

The white balance gain unit 123 performs gain adjustment according to a white balance gain of each of the color signals of RGB included in the digital image signals with adjusted black level data.

The gamma processing unit 124 performs gamma correction to perform gradation correction, such as halftone, such that the R, G, and B image signals subjected to the white balance adjustment have desired gamma characteristics.

The demosaic processing unit 125 subjects the R, G, and B image signals after gamma correction to a demosaic process. Specifically, the demosaic processing unit 125 subjects the R, G, and B image signals to a color interpolation process to generate a set of image signals (R signal, G signal, and B signal) output from the respective light receiving pixels of the image capture element 112. That is, although a pixel signal from each light receiving pixel is one of the R, G, and B image signals before color demosaic process, a set of three pixel signals of R, G, and B signals corresponding to each light receiving pixel is output after color demosaic process.

The RGB/YCrCb conversion unit 126 converts the R, G, and B signals of each pixel subjected to the demosaic process to a luminance signal Y and color difference signals Cr and Cb and outputs the luminance signal Y and the color difference signals Cr and Cb of each pixel.

The Y signal restoration processing unit 127 subjects the luminance signal Y output from the RGB/YCrCb conversion unit 126 to a restoration process based on a restoration filter stored in advance. The restoration filter is constituted of, for example, a deconvolution kernel (corresponding to the number of taps of M=7 and N=7) having a kernel size of 7×7, and a calculation coefficient (corresponding to restoration gain data, filter coefficient) corresponding to the deconvolution kernel, and is used for a deconvolution process (reverse convolution calculation process) of phase modulation of the optical filter 111. For the restoration filter, one corresponding to the optical filter 111 is stored in a memory (not shown) (for example, a memory incidentally attached with the Y signal restoration processing unit 127). The kernel size of the deconvolution kernel is not limited to 7×7.

Figure 19:
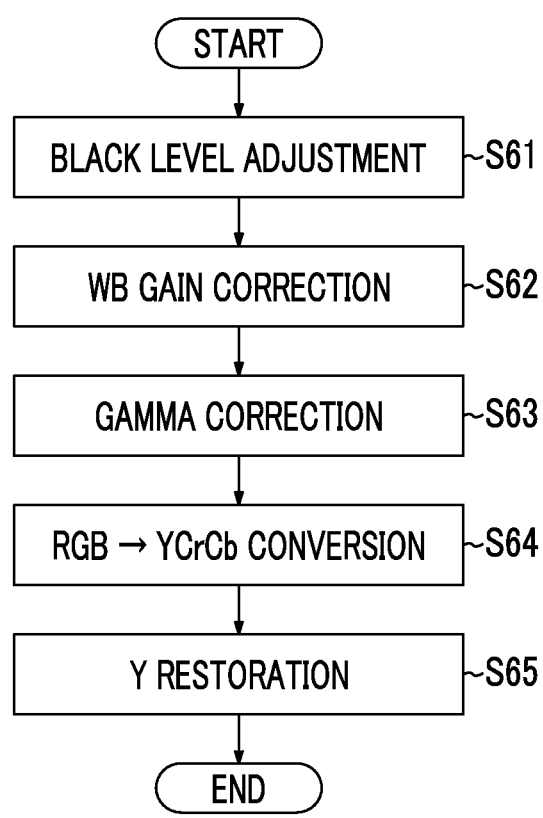
FIG. 19 is a diagram showing an example of a restoration processing flow in a restoration processing block shown in FIG. 17.

Next, the restoration process by the restoration processing block 120 will be described. FIG. 19 is a diagram showing an example of a restoration process flow by the restoration processing block 120 shown in FIG. 17.

The digital image signal is applied from the AD conversion unit 114 to one input of the black level adjustment unit 122, black level data is applied to the other input of the black level adjustment unit 122, and the black level adjustment unit 122 subtracts black level data from the digital image signal and outputs the digital image signal black level data subtracted to the white balance gain unit 123 (S61). With this, no black level component is included in the digital image signal, and a digital image signal indicating a black level becomes 0.

Image data after the black level adjustment is sequentially subjected to the processes by the white balance gain unit 123 and the gamma processing unit 124 (S62 and S63).

The R, G, and B signals subjected to gamma correction are subjected to the demosaic process in the demosaic processing unit 125 and are then converted to the luminance signal Y and the color difference signals Cr and Cb in the RGB/YCrCb conversion unit 126 (S64).

The Y signal restoration processing unit 127 subjects the luminance signal Y to the restoration process to apply the deconvolution process of phase modulation of the optical filter 111 of the EDoF optical system 110 (S65). That is, the Y signal restoration processing unit 127 performs the deconvolution process (reverse convolution calculation process) of a luminance signal (in this case, a luminance signal of 7×7 pixels) corresponding to a pixel group of a predetermined unit centering on an arbitrary pixel to be processed and the restoration filter (the 7×7 deconvolution kernel and the calculation coefficient) stored in the memory or the like in advance. The Y signal restoration processing unit 127 performs the restoration process for removing image blur of the entire image by repeating the deconvolution process of each pixel group of the predetermined unit so as to cover the entire area of the image capture surface. The restoration filter is determined according to the position of the center of the pixel group subjected to the deconvolution process. That is, the common restoration filter is applied to adjacent pixel groups. In addition, in order to simplify the restoration process, it is preferable to apply the common restoration filter to all pixel groups.

Figure 20:
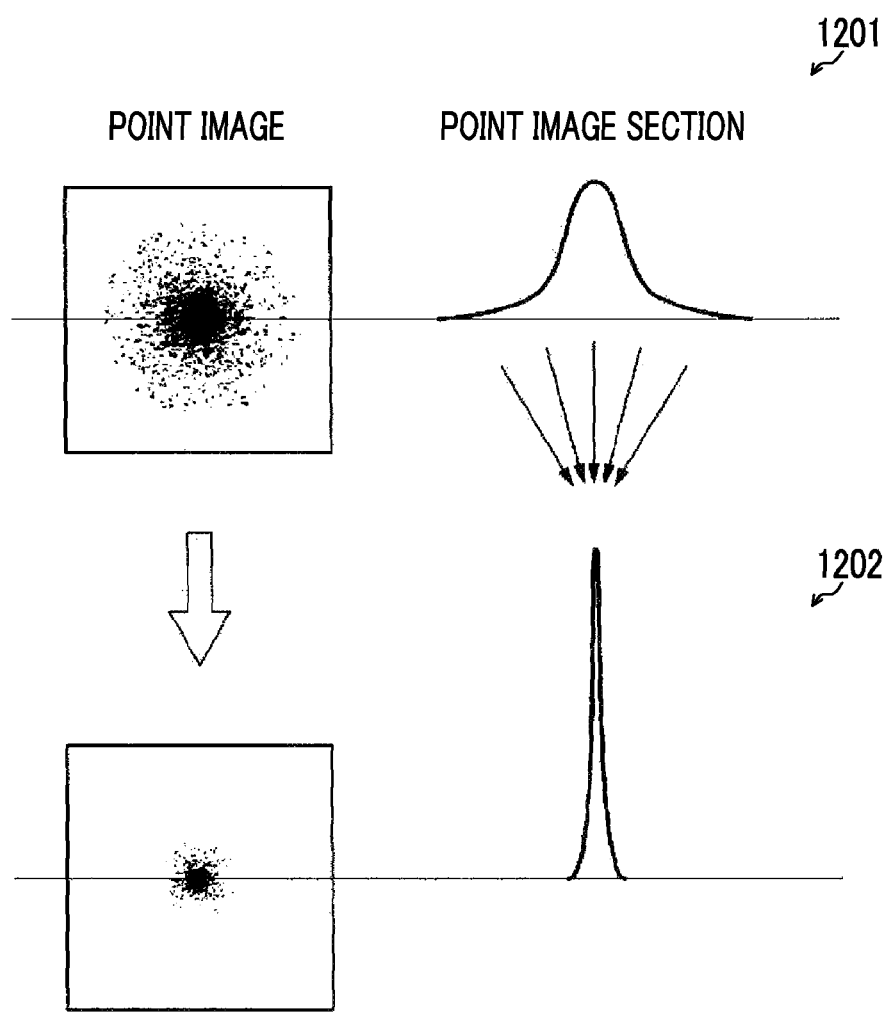
FIG. 20 is a diagram showing a restoration example of an image acquired through the EDoF optical system.

As indicated by reference numeral 1201 of FIG. 20, a point image (optical image) of the luminance signal after passing through the EDoF optical system 110 is formed on the image capture element 112 as a great point image (blurred image), but is restored to a small point image (image of high resolution) by the deconvolution process in the Y signal restoration processing unit 127 as indicated by reference numeral 1202 of FIG. 20.

As described above, the restoration process is applied to the luminance signal after the demosaic process, whereby it is not necessary to separately provide the parameters of the restoration process for RGB, and it is possible to accelerate the restoration process. Furthermore, instead of putting together the R, G, and B image signals corresponding to the R, G, and B pixels at discrete positions in one unit and performing the deconvolution process, the luminance signals of adjacent pixels are put together in a predetermined unit and the common restoration filter is applied to this unit and the deconvolution process is performed; therefore, the accuracy of the restoration process is improved. In regards to the color difference signals Cr and Cb, resolution does not need to be increased by the restoration process in terms of image quality because of the visual characteristic of human eyes. Furthermore, when recording an image in a compression format, such as JPEG, the color difference signals are compressed at a higher compression rate than the luminance signal; therefore, there is less necessity to increase resolution by the restoration process. Consequently, it is possible to achieve improvement of restoration accuracy and simplification and acceleration of the process.

The point image restoration process according to the respective embodiment of the invention can be applied to the restoration process of the EDoF system described above. That is, in the restoration process in the restoration processing block 120 (Y signal restoration processing unit 127) (S65 of FIG. 19), various processes (point image restoration process) described above by the point image restoration control processing unit 39 may be executed.

In the respective embodiments described above, although an aspect in which the point image restoration control processing unit 39 is provided in the camera body 14 (camera body controller 28) of the digital camera 10 has been described, the point image restoration control processing unit 39 may be provided in other devices, such as the computer 60 or the server 80.

For example, for processing image data in the computer 60, the point image restoration process of image data may be performed by a point image restoration control processing unit provided in the computer 60. Furthermore, when the server 80 is provided with a point image restoration control processing unit, for example, image data may be transmitted from the digital camera 10 or the computer 60 to the server 80, a point image restoration process may be performed for image data in the point image restoration control processing unit of the server 80, and image data (recovered image data) after the point image restoration process may be transmitted or provided to a transmission source.

An aspect to which the invention can be applied is not limited to the digital camera 10, the computer 60, and the server 80, and the invention can be applied to mobile devices having an image capture function and functions (call handling function, communication function, and other computer functions) other than image capturing, in addition to cameras having image capturing as a major function. As another aspect to which the invention can be applied, for example, mobile phones having a camera function, smartphones, personal digital assistants (PDAs), and portable game machines are given. Hereinafter, an example of a smartphone to which the invention can be applied will be described.

<Configuration of Smartphone>

Figure 21:
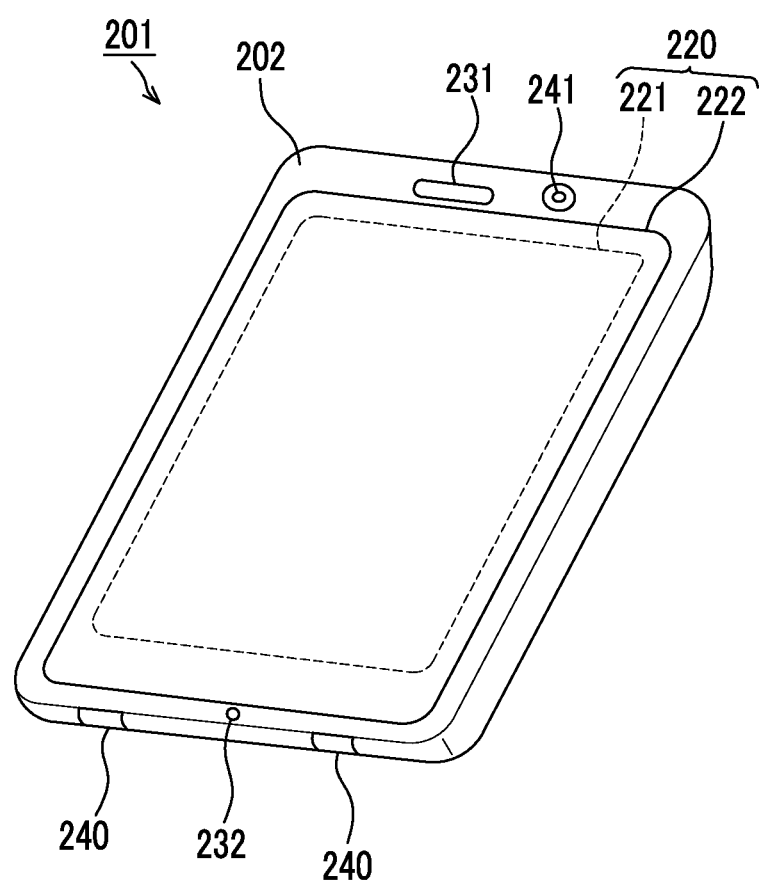
FIG. 21 shows the appearance of a smartphone which is an embodiment of an image capture device of the invention.

FIG. 21 shows the appearance of a smartphone 201 which is an embodiment of an image capture device of the invention. The smartphone 201 shown in FIG. 21 has a flat plate-like housing 202, and includes, on one surface of the housing 202, a display input unit 220 in which a display panel 221 as a display unit and an operation panel 222 as an input unit are integrated. The housing 202 includes a speaker 231, a microphone 232, an operating unit 240, and a camera unit 241. The configuration of the housing 202 is not limited thereto, and for example, a configuration in which a display unit and an input unit are separated can be used, or a configuration in which a folding structure or a slide mechanism is provided.

Figure 22:
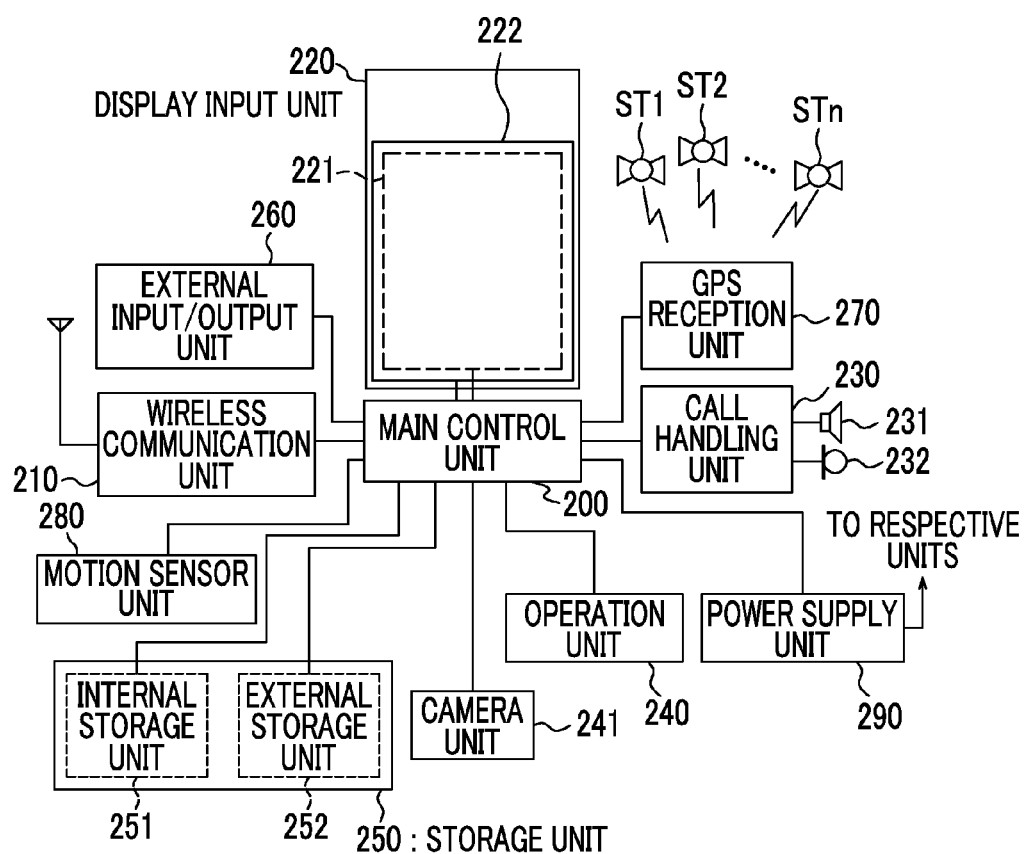
FIG. 22 is a block diagram showing the configuration of the smartphone shown in FIG. 21.

FIG. 22 is a block diagram showing the configuration of the smartphone 201 shown in FIG. 21. As shown in FIG. 22, the smartphone includes, as major components, a wireless communication unit 210, a display input unit 220, a call handling unit 230, an operating unit 240, a camera unit 241, a storage unit 250, an external input/output unit 260, a global positioning system (GPS) reception unit 270, a motion sensor unit 280, a power supply unit 290, and a main control unit 200. The smartphone 201 has, as a major function, a wireless communication function of performing mobile wireless communication through a base station device BS and a mobile communication network NW.

The wireless communication unit 210 performs wireless communication with the base station device BS in the mobile communication network NW according to an instruction of the main control unit 200. Transmission/reception of various kinds of file data, such as speech data or image data, electronic mail data, and the like, or reception of Web data, streaming data, or the like is performed using wireless communication.

The display input unit 220 is a so-called touch panel which displays images (still image and moving image), character information, or the like under the control of the main control unit 200 to visually transfer information to the user and detects a user's operation on the displayed information, and includes the display panel 221 and the operation panel 222.

The display panel 221 uses, for example, a liquid crystal display (LCD) or an organic electro-luminescence display (OELD), as a display device. The operation panel 222 is a device which is placed such that an image displayed on the display surface of the display panel 221 is visible, and detects one or a plurality of coordinates operated with the finger of the user or a stylus. If the device is operated with the finger of the user or the stylus, a detection signal generated due to the operation is output to the main control unit 200. Next, the main control unit 200 detects the operation position (coordinates) on the display panel 221 based on the received detection signal.

As shown in FIG. 21, the display panel 221 and the operation panel 222 of the smartphone 201 illustrated as an embodiment of an image capture device of the invention are integrated to constitute the display input unit 220, and the operation panel 222 is arranged so as to completely cover the display panel 221. When this arrangement is used, the operation panel 222 may have a function of detecting a user's operation in an area outside the display panel 221. In other words, the operation panel 222 may include a detection area (hereinafter, referred to as a display area) for a superimposed portion overlapping the display panel 221 and a detection area (hereinafter, referred to as a non-display area) for an outer edge portion not overlapping the display panel 221.

Although the size of the display area may completely match the size of the display panel 221, both do not necessarily match each other. The operation panel 222 may include two sensitive areas of an outer edge portion and an inside portion. In addition, the width of the outer edge portion is appropriately designed based on the size of the housing 202 or the like. Furthermore, as a position detection system which is used in the operation panel 222, a matrix switch system, a resistive film system, a surface acoustic wave system, an infrared system, an electromagnetic induction system, an electrostatic capacitance system, or the like is given, and any system can be used.

The call handling unit 230 includes a speaker 231 and a microphone 232, can convert speech of the user input through the microphone 232 to speech data processable in the main control unit 200 and can output speech data to the main control unit 200, or decodes speech data received by the wireless communication unit 210 or the external input/output unit 260 and outputs speech from the speaker 231. As shown in FIG. 21, for example, the speaker 231 can be mounted on the same surface as the surface on which the display input unit 220 is provided, and the microphone 232 may be mounted on the side surface of the housing 202.

The operating unit 240 is a hardware key, such as a key switch, and receives an instruction from the user. For example, as shown in FIG. 21, the operating unit 240 is a push button-type switch which is mounted on the side surface of the housing 202 of the smartphone 201, and is turned on when pressed with a finger or the like and is turned off by a restoration force of the panel or the like if the finger is released.

The storage unit 250 stores a control program or control data of the main control unit 200, application software, address data in association with the name, telephone number, and the like of a communication partner, data of transmitted and received electronic mail, Web data downloaded by Web browsing, downloaded content data, or temporarily stores streaming data or the like. The storage unit 250 is constituted of an internal storage unit 251 embedded in the smartphone and an external storage unit 252 which has a detachable external memory slot. The internal storage unit 251 and the external storage unit 252 constituting the storage unit 250 are implemented using a memory (for example, MicroSD (Registered Trademark) memory or the like) of a flash memory type, a hard disk type, a multimedia card micro type, or a card type, or a storage medium, such as a random access memory (RAM) or a read only memory (ROM).

The external input/output unit 260 plays a role of an interface with all external devices connected to the smartphone 201, and is provided for direct or indirect connection to other external devices by communication or the like (for example, universal serial bus (USB), IEEE1394 or the like), or a network (for example, Internet, wireless LAN, Bluetooth (Registered Trademark), radio frequency identification (RFID), infrared data association (IrDA) (Registered Trademark), ultra wideband (UWB) (Registered Trademark), ZigBee (Registered Trademark), or the like).

The external device connected to the smartphone 201 is, for example, a wired or wireless headset, a wired or wireless external charger, a wired or wireless data port, a memory card connected through a card socket, a subscriber identity module card (SIM)/user identity module card (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone, or the like. The external input/output unit can transfer data transmitted from the external devices to the respective components in the smartphone 201, or can transmit data in the smartphone 201 to the external devices.

The GPS reception unit 270 receives GPS signals transmitted from GPS satellites ST1 to STn according to an instruction of the main control unit 200, executes a positioning calculation process based on a plurality of received GPS signals, and detects the position of the smartphone 201 having latitude, longitude, and altitude. When positional information can be acquired from the wireless communication unit 210 or the external input/output unit 260 (for example, a wireless LAN), the GPS reception unit 270 may detect the position using the positional information.

The motion sensor unit 280 includes, for example, a three-axis acceleration sensor or the like, and detects physical motion of the smartphone 201 according to an instruction of the main control unit 200. The moving direction or acceleration of the smartphone 201 can be detected by detecting physical motion of the smartphone 201. The detection result is output to the main control unit 200.

The power supply unit 290 supplies power stored in a battery (not shown) to the respective units of the smartphone 201 according to an instruction of the main control unit 200.

The main control unit 200 includes a microprocessor, operates according to the control program or control data stored in the storage unit 250, and integrally controls the respective units of the smartphone 201. The main control unit 200 has a mobile communication control function of controlling the respective units of a communication system in order to perform speech communication or data communication through the wireless communication unit 210, and an application processing function.

The application processing function is implemented by the main control unit 200 operating according to application software stored in the storage unit 250. The application processing function is, for example, an infrared communication function of controlling the external input/output unit 260 to perform data communication with a device facing the smartphone 201, an electronic mail function of transmitting and receiving electronic mail, a Web browsing function of browsing Web pages, or the like.

The main control unit 200 has an image processing function of displaying video on the display input unit 220, or the like based on image data (still image or moving image data), such as received data or downloaded streaming data. The image processing function refers to a function of the main control unit 200 decoding image data, subjecting the decoding result to an image process, and displaying an image on the display input unit 220.

The main control unit 200 executes display control on the display panel 221, and operation detection control for detecting a user's operation through the operating unit 240 and the operation panel 222.

With the execution of the display control, the main control unit 200 displays an icon for activating application software or a software key, such as a scroll bar, or displays a window for creating electronic mail. The scroll bar refers to a software key for receiving an instruction to move a display portion of an image which is too large to fit into the display area of the display panel 221.

With the execution of the operation detection control, the main control unit 200 detects a user's operation through the operating unit 240, receives an operation on the icon or an input of a character string in an entry column of the window through the operation panel 222, or receives a scroll request of a display image through the scroll bar.

Furthermore, with the execution of the operation detection control, the main control unit 200 has a touch panel control function of determining whether an operation position on the operation panel 222 is the superimposed portion (display area) overlapping the display panel 221 or the outer edge portion (non-display area) not overlapping the display panel 221, and controlling the sensitive area of the operation panel 222 or the display position of the software key.

The main control unit 200 may detect a gesture operation on the operation panel 222 and may execute a function set in advance based on the detected gesture operation. The gesture operation is not a conventional simple touch operation, but means an operation to render a track with a finger or the like, an operation to simultaneously designate a plurality of positions, or an operation to render a track for at least one of a plurality of positions by combining the operations.

The camera unit 241 is a digital camera which electronically captures an image using an image capture element, such as a complementary metal oxide semiconductor (CMOS) or a charge-coupled device (CCD). The camera unit 241 can convert image data obtained by image capturing to compressed image data, such as joint photographic coding experts group (JPEG), and can record image data in the storage unit 250 or can output image data through the external input/output unit 260 or the wireless communication unit 210 under the control of the main control unit 200. As shown in FIG. 21, in the smartphone 201, the camera unit 241 is mounted on the same surface of the display input unit 220; however, the mounting position of the camera unit 241 is not limited thereto, and the camera unit 241 may be mounted on the rear surface of the display input unit 220, or a plurality of camera units 241 may be mounted. When a plurality of camera units 241 are mounted, the camera unit 241 which is used to capture an image is switched from one to another and captures an image alone, or a plurality of camera units 241 are simultaneously used to capture images.

The camera unit 241 can be used for various functions of the smartphone 201. For example, an image acquired by the camera unit 241 can be displayed on the display panel 221, or an image in the camera unit 241 can be used as one operation input on the operation panel 222. When the GPS reception unit 270 detects the position, the position may be detected with reference to an image from the camera unit 241. In addition, the optical axis direction of the camera unit 241 of the smartphone 201 may be determined or the current use environment can be determined with reference to an image from the camera unit 241 without using the three-axis acceleration sensor, or using the three-axis acceleration sensor. Of course, an image from the camera unit 241 may be used in application software.

In addition, image data of a still image or a moving image can be attached with positional information acquired by the GPS reception unit 270, speech information acquired by the microphone 232, speech information (may be text information through speech-text conversion in the main control unit or the like), posture information acquired by the motion sensor unit 280, or the like and can be recorded in the storage unit 250. Image data may be output through the external input/output unit 260 or the wireless communication unit 210.

In the smartphone 201 described above, the respective processing units described above in connection with the point image restoration process can be appropriately implemented by, for example, the main control unit 200, the storage unit 250, and the like.

The invention is not limited to the embodiments described above, and various modifications can be made without departing from the spirit of the invention.

EXPLANATION OF REFERENCES

10: digital camera, 12: lens unit, 14: camera body, 16: lens, 17: diaphragm, 18: optical system operating unit, 20: lens unit controller, 22: lens unit input/output unit, 26: image capture element, 28: camera body controller, 29: user interface, 30: camera body input/output unit, 32: input/output interface, 34: device control unit, 35: image processing unit, 37: zoom control unit, 39: point image restoration control processing unit, 41: filter application unit, 42: gain adjustment unit, 43: memory, 50: image height central portion, 51: image height peripheral portion, 52: optical system, 60: computer, 62: computer input/output unit, 64: computer controller, 66: display, 70: Internet, 80: server, 82: server input/output unit, 84: server controller, 101: image capture module, 110: EDoF optical system, 110A: photographing lens, 111: optical filter, 112: image capture element, 114: AD conversion unit, 120: restoration processing block, 122: level adjustment unit, 123: white balance gain unit, 124: gamma processing unit, 125: demosaic processing unit, 126: RGB/YCrCb conversion unit, 127: Y signal restoration processing unit, 200: main control unit, 201: smartphone, 202: housing, 210: wireless communication unit, 220: display input unit, 221: display panel, 222: operation panel, 230: call handling unit, 231: speaker, 232: microphone, 240: operating unit, 241: camera unit, 250: storage unit, 251:

internal storage unit, 252: external storage unit, 260: external input/output unit, 270: GPS reception unit, 280: motion sensor unit, 290: power supply unit

What is claimed is:

1. An image processing device comprising:
a filter application circuit which applies a restoration filter based on a point spread function of an optical system to source image data acquired through photographing using the optical system to acquire restored image data; and
a gain adjustment circuit which performs adjustment of an amplification factor of a difference between the source image data and the restored image data and acquires recovered image data from the difference and the source image data,
wherein the filter application circuit uses a common filter determined regardless of a value of a magnification of an optical zoom of the optical system as the restoration filter, and
the gain adjustment circuit determines the amplification factor based on the magnification of the optical zoom of the optical system.

2. The image processing device according to claim 1,
wherein the restoration filter is determined based on a diaphragm value of the optical system for acquiring the source image data.

3. The image processing device according to claim 1,
wherein the filter application circuit acquires the restored image data using a common filter determined regardless of the value of the magnification of the optical zoom of the optical system as the restoration filter in case where the diaphragm value of the optical system for acquiring the source image data is a value on a diaphragm side smaller than a first diaphragm value, and
the gain adjustment circuit determines the amplification factor based on the magnification of the optical zoom of the optical system in case where the diaphragm value of the optical system for acquiring the source image data is a value on a diaphragm side smaller than the first diaphragm value.

4. The image processing device according to claim 2,
wherein the filter application circuit acquires the restored image data using a common filter determined regardless of the value of the magnification of the optical zoom of the optical system as the restoration filter in case where the diaphragm value of the optical system for acquiring the source image data is a value on a diaphragm side smaller than a first diaphragm value, and
the gain adjustment circuit determines the amplification factor based on the magnification of the optical zoom of the optical system in case where the diaphragm value of the optical system for acquiring the source image data is a value on a diaphragm side smaller than the first diaphragm value.

5. The image processing device according to claim 1,
wherein the filter application circuit selects a filter for use as the restoration filter from among a plurality of filter candidates as a candidate of a common filter determined regardless of the value of the magnification of the optical zoom of the optical system based on the difference between a modulation transfer function of an image height central portion in the optical system on an optical axis or in the vicinity of the optical axis and a modulation transfer function of an image height peripheral portion in the optical system having an image height greater than the image height central portion.

6. The image processing device according to claim 2,
wherein the filter application circuit selects a filter for use as the restoration filter from among a plurality of filter candidates as a candidate of a common filter determined regardless of the value of the magnification of the optical zoom of the optical system based on the difference between a modulation transfer function of an image height central portion in the optical system on an optical axis or in the vicinity of the optical axis and a modulation transfer function of an image height peripheral portion in the optical system having an image height greater than the image height central portion.

7. The image processing device according to claim 3,
wherein the filter application circuit selects a filter for use as the restoration filter from among a plurality of filter candidates as a candidate of a common filter determined regardless of the value of the magnification of the optical zoom of the optical system based on the difference between a modulation transfer function of an image height central portion in the optical system on an optical axis or in the vicinity of the optical axis and a modulation transfer function of an image height peripheral portion in the optical system having an image height greater than the image height central portion.

8. The image processing device according to claim 5,
wherein the plurality of filter candidates include a first filter candidate and a second filter candidate different from the first filter candidate, and
the filter application circuit uses the first filter candidate as the restoration filter in case where the difference between the modulation transfer function of the image height central portion and the modulation transfer function of the image height peripheral portion is smaller than a first threshold value, and uses the second filter candidate as the restoration filter in case where the difference between the modulation transfer function of the image height central portion and the modulation transfer function of the image height peripheral portion is equal to or greater than the first threshold value.

9. The image processing device according to claim 6,
wherein the plurality of filter candidates include a first filter candidate and a second filter candidate different from the first filter candidate, and
the filter application circuit uses the first filter candidate as the restoration filter in case where the difference between the modulation transfer function of the image height central portion and the modulation transfer function of the image height peripheral portion is smaller than a first threshold value, and uses the second filter candidate as the restoration filter in case where the difference between the modulation transfer function of the image height central portion and the modulation transfer function of the image height peripheral portion is equal to or greater than the first threshold value.

10. The image processing device according to claim 1,
wherein, in case where the source image data is a moving image, the filter application circuit acquires the restored image data using a common filter determined regardless of the value of the magnification of the optical zoom of the optical system as the restoration filter, and
in case where the source image data is a moving image, the gain adjustment circuit determines the amplification factor based on the magnification of the optical zoom of the optical system.

11. The image processing device according to claim 10, wherein, in case where the source image data is a still image, the filter application circuit acquires the restored image data using the restoration filter determined based on the magnification of the optical zoom of the optical system.

12. The image processing device according to claim 11, wherein, in case where the source image data is acquired by still image photographing during moving image photographing, the filter application circuit acquires the restored image data using the restoration filter determined based on the magnification of the optical zoom of the optical system.

13. The image processing device according to claim 1, wherein the optical system has a lens unit which modulates a phase to extend a depth of field.

14. An image capture device comprising:
an image capture element which acquires source image data by photographing using an optical system; and
the image processing device according to claim 1.

15. The image capture device according to claim 14, further comprising:
a zoom control unit which is able to switch between an optical zoom and a digital zoom,
wherein the magnification of the optical zoom to be a criterion for switching between the optical zoom and the digital zoom is determined based on the point spread function of the optical system.

16. The image capture device according to claim 15, wherein the magnification of the optical zoom to be a criterion for switching between the optical zoom and the digital zoom is determined based on the difference between a modulation transfer function of an image height central portion in the optical system on an optical axis or in the vicinity of the optical axis and a modulation transfer function of an image height peripheral portion in the optical system having an image height greater than the image height central portion.

17. The image capture device according to claim 15, wherein the magnification of the optical zoom to be a criterion for switching between the optical zoom and the digital zoom is determined based on a zoom direction for acquiring the source image data.

18. The image capture device according to claim 14, wherein the gain adjustment circuit determines the amplification factor based on a zoom direction for acquiring the source image data.

19. An image processing method using the image capture device according to claim 1 comprising:
a filter application step of applying a restoration filter based on a point spread function of an optical system to source image data acquired through photographing using the optical system to acquire restored image data; and
a gain adjustment step of performing adjustment of an amplification factor of the difference between the source image data and the restored image data and acquiring recovered image data from the difference after the adjustment is performed and the source image data,
wherein, in the filter application step, a common filter determined regardless of a value of a magnification of an optical zoom of the optical system is used as the restoration filter, and
in the gain adjustment step, the amplification factor is determined based on the magnification of the optical zoom of the optical system.

20. A non-transitory computer readable medium storing a program which causes a computer to execute the image processing method according claim 19, the program comprising:
a procedure for applying a restoration filter based on a point spread function of an optical system to source image data acquired through photographing using the optical system to acquire restored image data; and
a procedure for performing adjustment of an amplification factor of the difference between the source image data and the restored image data and acquiring recovered image data from the difference after the adjustment is performed and the source image data,
wherein, in the procedure for acquiring the restored image data, a common filter determined regardless of a value of a magnification of an optical zoom of the optical system is used as the restoration filter, and
in the procedure for acquiring the recovered image data, the amplification factor is determined based on the magnification of the optical zoom of the optical system.

* * * * *